United States Patent
Lampert et al.

(10) Patent No.: US 10,475,072 B2
(45) Date of Patent: Nov. 12, 2019

(54) SYSTEM AND METHOD FOR PROVIDING DYNAMIC PRODUCT OFFERINGS

(71) Applicant: TRANSFORM SR BRANDS LLC, Hoffman Estates, IL (US)

(72) Inventors: Edward S. Lampert, Bay Harbor, FL (US); Leena Munjal, Algonquin, IL (US); Varun Reddy Agasti, Algonquin, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 283 days.

(21) Appl. No.: 14/693,263

(22) Filed: Apr. 22, 2015

(65) Prior Publication Data

US 2015/0302474 A1 Oct. 22, 2015

Related U.S. Application Data

(60) Provisional application No. 61/982,538, filed on Apr. 22, 2014.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0255* (2013.01); *G06Q 30/0269* (2013.01); *G06Q 30/0601* (2013.01)

(58) Field of Classification Search
CPC .................................................. G06Q 30/0255
See application file for complete search history.

(56) References Cited

U.S. PATENT DOCUMENTS

| 6,181,338 B1* | 1/2001 | Brodhun | G06F 3/0481 715/798 |
| 8,015,068 B2 | 9/2011 | Swamy et al. | |
| 8,301,504 B2 | 10/2012 | Swamy et al. | |
| 9,020,956 B1* | 4/2015 | Barr | G06F 17/30864 707/748 |
| 2006/0023776 A1* | 2/2006 | Hsu | G01S 19/30 375/150 |
| 2008/0256037 A1* | 10/2008 | Yahia | G06Q 30/02 |
| 2011/0029385 A1* | 2/2011 | Engel | G06Q 30/02 705/14.53 |
| 2013/0124449 A1* | 5/2013 | Pinckney | G06F 17/30867 706/52 |
| 2014/0095496 A1* | 4/2014 | Xue | G06F 17/3053 707/732 |
| 2014/0365272 A1* | 12/2014 | Hurewitz | G06Q 30/0201 705/7.29 |

OTHER PUBLICATIONS

Bianca London, That's one way to get Top Gear! Futuristic fashion car scans stylish pedestrians, buys their clothes and has them delivered to the vehicle . . . before turning itself into a changing room, Mail Online, http://www.dailymail.co .q ukifemaillarticle-2292135/Top-gear-New-shopping mobile from Zanando scans stylish pedestrians, Mar. 12, 2013, (5 pages).

\* cited by examiner

*Primary Examiner* — Bennett M Sigmond
*Assistant Examiner* — Scott C Anderson
(74) *Attorney, Agent, or Firm* — McAndrews, Held & Malloy, Ltd.

(57) ABSTRACT

A system and method for dynamically selecting products for presentation to consumers in a hands-on environment of a merchant, based upon social signals acquired from consumers in an online environment.

18 Claims, 20 Drawing Sheets

SYSTEM AND METHOD FOR PROVIDING DYNAMIC PRODUCT OFFERINGS

CROSS-REFERENCE TO RELATED APPLICATIONS

The present application makes reference to, claims benefit of, and claims priority to U.S. Provisional Patent Application No. 61/982,538, filed Apr. 22, 2014, which is hereby incorporated herein by reference, in its entirety.

FIELD

Aspects of the disclosure relate to systems and methods for marketing products to consumers. More specifically, certain aspects of the present disclosure relate to systems and methods for dynamically selecting products for presentation to consumers in a hands-on environment of a merchant, based upon social signals acquired from consumers in an online environment.

BACKGROUND

Consumers shopping for products have several options. The consumer may visit one or more traditional "brick-and-mortar" locations of various merchants, where they may see, touch, and try actual product(s) of interest that are on display and that are typically available in the inventory of the merchant. The consumer may make a purchase, and may then take the selected product with them. The inventory or products available for purchase at merchant locations is normally selected for sale by a buyer, based upon their past experience with similar products, and is limited by the space available for product display and storage, and any delays in deliveries of products to the merchant location by the supplier.

The consumer may also shop online using, for example, the Internet, may search the online product catalogs of various merchants for the desired product(s), and view product information and product reviews. Based on their own experiences and information gleaned from online sources, the consumer may then order and pay for the desired products, which the consumer may pick up at a brick-and-mortar location of the merchant, or may have shipped to a location of their choice such as, for example, their home or office. The consumer may make a purchase decision without ever having an opportunity to personally view, handle, or use any of the available products of interest.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method for dynamically selecting products for presentation to consumers in a hands-on environment of a merchant, based upon social signals acquired from consumers in an online environment, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
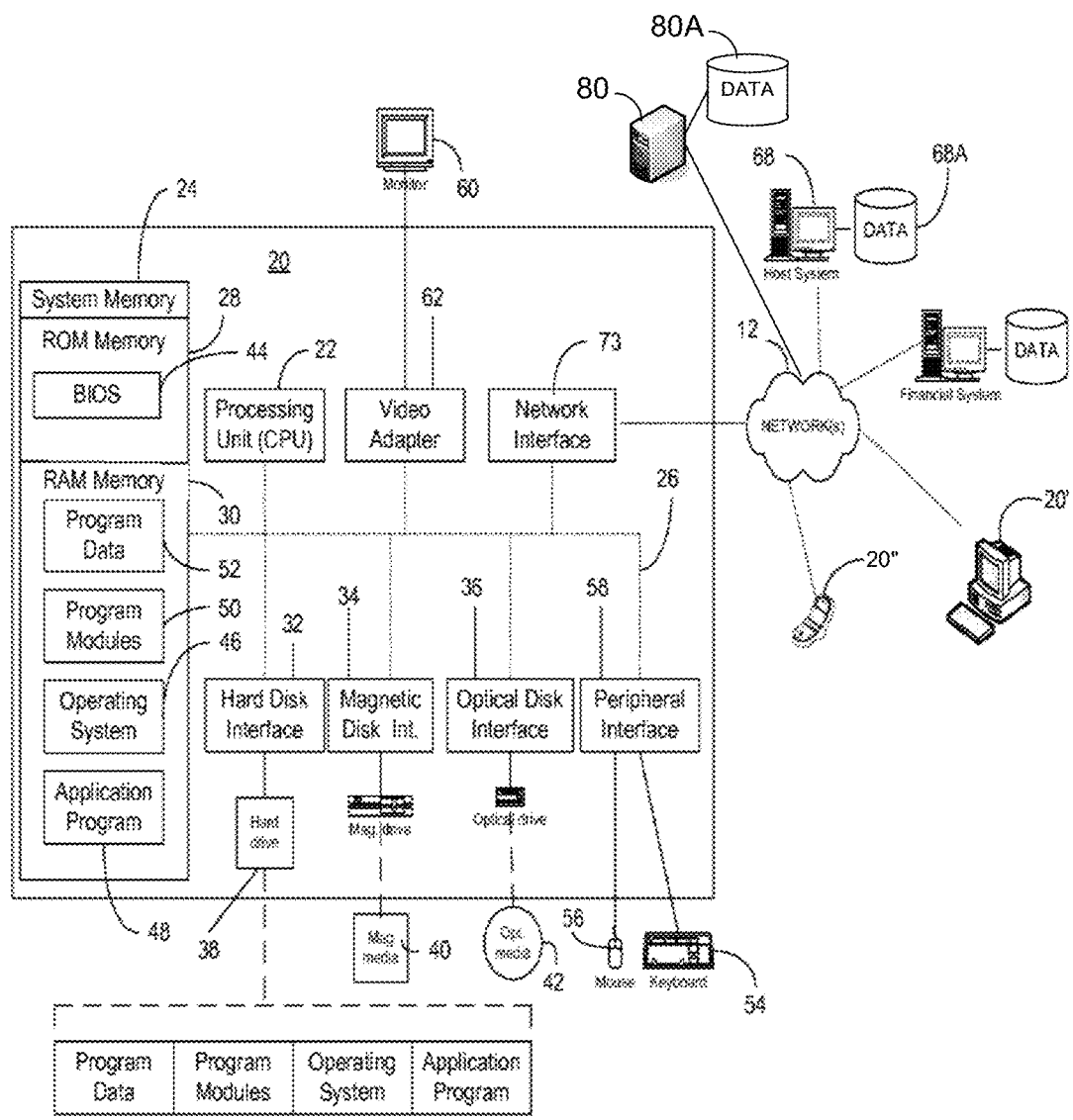
FIG. 1 is an illustration of exemplary computer network in which a representative embodiment of the present disclosure may be practiced.

Aspects of the disclosure relate to systems and methods for marketing products to consumers. More specifically, certain aspects of the present disclosure relate to systems and methods for dynamically selecting products for presentation to consumers in a hands-on environment of a merchant, based upon social signals acquired from consumers in an online environment.

The following description of example methods and apparatus is not intended to limit the scope of the description to the precise form or forms detailed herein. Instead the following description is intended to be illustrative so that others may follow its teachings.

The terms "merchant" and "sponsoring merchant/merchants" may be used herein to refer to the owner and/or operator of a business enterprise that operates either or both of traditional "brick-and-mortar" business locations or an e-commerce or social e-commerce platform as described herein, or enters into an agreement with another to operate such a platform on their behalf.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc.

The terms "customer," "consumer," "end-user," and "user" may be used herein interchangeably to refer to a potential or existing purchaser of products and/or services of a merchant or business.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population. The term "social signal" may be used herein to refer to an expression by a user of a relationship with or feeling about a person, product, or thing. In the context of the present disclosure, the terms "social signal" and "social signal information" refer to a relationship with or feeling about a product.

The term "follow" may be used herein to refer to a user request to be kept informed about a particular person, place, or thing.

The term "share" may be used herein to refer to a user request to communicate to members of the user's family, friends, or social network, information about what is being viewed by a user.

The terms "like," "want," "have" or "own," and "recommend" may be used to refer to particular social signals that may be represented on a web page in association with a product, and may be selected by a consumer to represent their relationship with or feeling about the product.

The term "e-commerce" may be used herein to refer to business or commerce that is transacted electronically, as over the Internet.

The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

As utilized herein, the terms "exemplary" or "example" means serving as a non-limiting example, instance, or illustration. As utilized herein, the term "e.g." introduces a list of one or more non-limiting examples, instances, or illustrations.

The methods and systems disclosed herein may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network in which a representative embodiment of the present disclosure may be practiced. The following discloses various example systems and methods for, by way of example and not limitation, dynamically selecting products to be displayed and sold to consumers in a hands-on environment, based upon social signals from an online environment. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any suitable device having the ability to execute instructions such as, by way of example, a personal computer, mainframe computer, personal-digital assistant ("FDA"), cellular telephone, tablet computer, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable devices.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any suitable type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; receiving questions from individuals seeking information, distributing the questions to a targeted audience, and returning suitable answers to the requestor; and providing a service call infrastructure for providing the requestor with a distributed customer service experience. While such a system may also include executable instructions for, among other things, for dynamically select products to be displayed and sold to consumers in a hands-on environment, based upon social signals from an online environment, the capabilities described herein are preferably provided by a computer system that has been configured to efficiently support the functionality involved in supporting a representative embodiment of the present disclosure such as, for example, the computer system 80 and data storage 80A of FIG. 1.

Communications between the processing device 20 and the host system 68 or computer system 80 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68, the computer system 80, and processing devices 20, 20' and 20".

A representative embodiment of the present disclosure makes use of product-related social signals expressed by users of a social ecommerce network to enable a merchant to make trending products available to consumers shopping in retail business locations of the merchant.

A representative embodiment of the present disclosure may monitor, track, or acquire what may be referred to herein as "social signal information" representative of consumer relationships with and/or feelings about products available in an online, e-commerce environment, in order to identify products to be placed on display and available for order by consumers in what may referred to an "online showroom" in a traditional physical or "brick-and-mortar" retail merchant location.

A representative embodiment of the present disclosure may be described as an "online showroom" that connects an online or e-commerce experience and a store or "hands-on" experience for customers, so the consumer can experience the best of both worlds. That is, a representative embodiment of the present disclosure provides a showroom experience in a store setting that displays, for example, the best selling/most socially engaging products available online, permitting consumer interaction (i.e., a "hands-on" touch and feel experience) with those products, and that provides the ease of shopping through online terminals (e.g., kiosks and other devices) and mobile devices of consumers (e.g., cellular and or smart phones). Products selected for display may be purchased by a consumer using a consumer device such as, by way of example and not limitation, a mobile phone, a smart phone, or a tablet computer, and the order may be fulfilled by a vendor of the product using direct shipment of the ordered product(s) to the consumer's home.

A representative embodiment of the present disclosure enables a merchant to showcase best selling, most popular products from an online marketplace; provides the consumer with the opportunity to have personal, hands-on, interactive experience with products normally available only via an online vendor, before purchase; and makes it possible for the merchant to provide product demonstrations both at the merchant "online showroom" location, and streamed live to other parts of the merchant location and to other locations of the merchant, and via an online website.

A representative embodiment of the present disclosure may employ a physical showroom located in traditional, "brick-and-mortar" stores to showcase products available primarily or exclusively online. The displayed products may, for example, be online items that are "best selling items," or those online items that are socially engaging such as, by way of example and not limitation, those products available online that are "most liked," "most wanted," "most owned," or "most recommended." A representative embodiment of the present disclosure brings the store and online experience together, so that customers are able to touch and feel products in person, before making a decision to buy those items online. A representative embodiment of the present disclosure may physically display only one or a limited number of a particular product, and local inventory may not be stocked at the merchant location for immediate sale to consumers. In some representative embodiments of the present disclosure, physical/display/working samples of a product may not be available for use, viewing, and/or handling, but product images (e.g., still or video) may be presented in printed or electronic form (e.g., slide shows or video presentations) shown on monitors viewable by consumers. Such information may include a form of code (e.g., a UPC or other barcode, a 2 dimensional code such as a QR code) or other form of computer-readable identifier for the product being displayed, to be captured by a user device. The consumer may interact with the products on display, in a live environment in which the product may be used by the consumer. The consumer may then use a mobile application on their own electronic device to scan identifying information for the product, or use an in-store kiosk, to place and pay for an order of the desired product(s), which may then be shipped by the merchant, product supplier, or product vendor by direct, merchant/supplier/vendor-to-home shipment of the merchandise. In this manner, the merchant need not maintain a local inventory of the products in the "online showroom" at each merchant location. In some representative embodiments of the present disclosure, if the product selected by the consumer is not available from a first merchant/supplier/vendor of the selected product, the system supporting the "online showroom" may route the order to another merchant/supplier/vendor/to provide exactly the product selected by the consumer. This gives suppliers/vendors of online-only products a venue in which to provide access to their products in a physical environment. In addition, the streaming of live product demonstrations to other parts of a merchant location, to other merchant locations, and via an online website, enables consumer viewing and purchase of the showcased products by a wider audience. In some representative embodiments of the present disclosure, product information may be presented electronically (e.g., still images or prerecorded or live video) or in print form, for use by the consumer in making a product selection, without any corresponding products on display for consumer trial and/or examination. Further, the products displayed in any given merchant "online showroom" may be selected based on social signals received from consumers within a certain geographic region or certain distance proximity to the merchant location having the "online showroom."

In a representative embodiment of the present disclosure, the consumer experience may be described as having a number of parts. The consumer may have a new store experience in which certain trending, socially engaging, or popular products normally only available online, are showcased at a traditional retail location of a merchant. The products may be displayed in a way that permits the consumer to capture product information using, by way of example and not limitation, image capture circuitry (e.g., optical scanning of a universal product code (UPC), "quick response" (QR) code, or graphic/image for Augmented Reality (AR)), or wireless interface circuitry (e.g., Bluetooth, Near Field Communication (NFC), or other electromagnetic signal protocol) supported by their personal electronic device. In addition, the consumer may create a list of products that they would like to try on in a digital form through a physical representation of a product showroom (e.g., from different vendors and sellers). The consumer may physically try the latest, most popular products at the merchant location, and may have the product shipped to their home, without the need to wait to go through check-out, or to carry the product from the merchant location to their vehicle or during further shopping. Further, the consumer may view a live product demonstration at any of various locations within a store, online at home, or on their mobile device wherever they may be, and may scan or capture an optical code from the display being viewed, to arrange for product purchase and delivery, which may greatly reduce the time needed to complete and enjoy a purchase.

Figure 2:
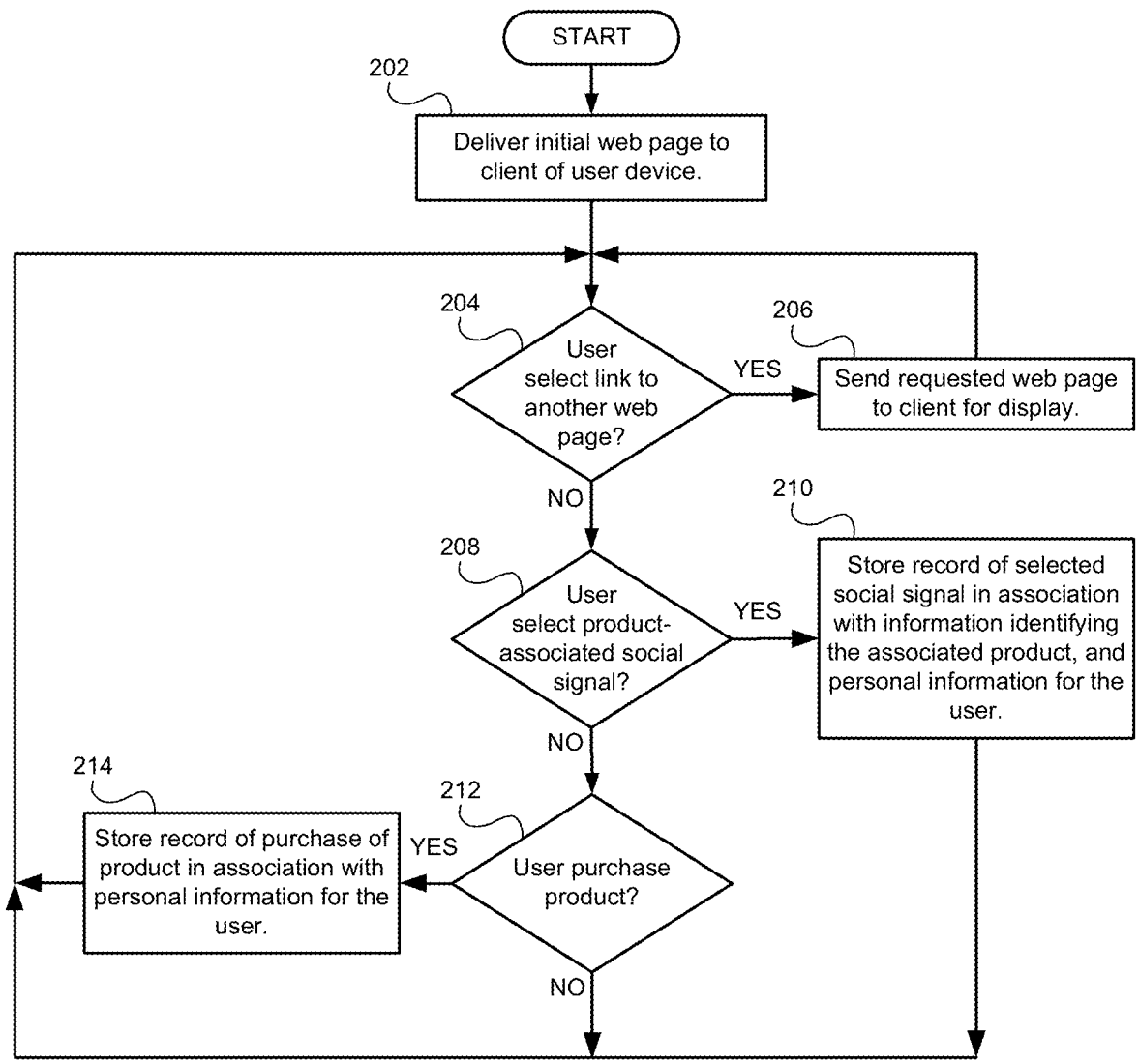
FIG. 2 is a flowchart illustrating an exemplary method of operating a web site that gathers social signal information, in accordance with a representative embodiment of the present disclosure.

FIG. 2 is a flowchart illustrating an exemplary method of operating a web site that gathers social signal information, in accordance with a representative embodiment of the present disclosure. The method of FIG. 2 may be performed by various elements of FIG. 1 including, by way of example and not limitation, the computer system 80 of FIG. 1. The following discussion of the method of FIG. 2 may make reference to various elements of the computer network of FIG. 1. It should be noted that the actions depicted in FIG. 2 have been simplified to address specific aspects of operation of a computer system that may perform the method, and that a system supporting the method of FIG. 2 may perform a greater number of actions and more features of a web-based user interface than discussed herein, without departing from the spirit and scope of the present disclosure.

The method of FIG. 2 begins at block 202, when a system in accordance with the present disclosure (e.g., the computer system 80) delivers an initial or "landing page" to a client of a user device (e.g., a user-downloadable software application or "app" for a mobile device, or in some cases, a "browser"), following user access to a web site supported by the system, in accordance with the present disclosure. The messages representing user access to the initial web page may be received by the system from, for example, a web browser running on a personal computer (PC) of the user, or from an mobile application or "app" running on a user device such as, by way of example and not limitation, a smart phone; a media player; an e-reader, or a tablet computer, such as the processing devices 20, 20', 20" of FIG. 1. The web page returned to the client on the user device may, by way of example and not limitation, include various user interface elements such as links to other web pages, icons that cause the execution of page scripting code, and icons that represent various user responses, inputs, and social signal information to the system. Examples of some user responses, inputs, and social signal information include the selection of command buttons (e.g., "add to cart," "proceed to checkout," "place order," "display order details"); the entry of strings of characters into text fields and the selection of options of a menu or pull-down menu; and the selection of "Like," "Want," "Have," number of stars, "thumbs-up;" respectively.

Next, at block 204, the system performing the method of FIG. 2 may determine whether the user has selected a link to another web page. If it is determined that the client at the user device has sent a request for a web page, then at block 206, the method causes the system to send the requested web page to the client of the user device, for display. The method of FIG. 2 then continues at block 204. If, however, it is determined that the user did not select a link requesting a web page, the method of FIG. 2 proceeds to block 208.

At block 208, the method of FIG. 2 causes the system to determine whether the user selected a user interface element representing a social signal associated with a product. Such a selection may, for example, cause the system to receive, from the client of the user device, information that identifies the social signal selected by the user. The information that identifies the social signal selected by the user may, in one representative embodiment, not be received by the system directly from the user, but may instead be received using an application program interface (API) of another system such as, for example, a social e-commerce system on which the user is shopping for products and/or services, while in another representative embodiment, the system may receive such information directly from the user. The information that identifies social signals selected by a plurality of users, which may represent sentiment of each user with respect to a particular product, may be described as a stream of such information. While interactions of users with a website of a merchant may result in multiple instances of information identifying a product and an associated indication of sentiment in regard to the product, the collection of such interaction information for all users of a merchant website may identify only a limited number of different or unique products in any period of time, those identified products being products that may be described as "trending" or of greatest interest to those users of the website. Such social signal information may represent the relationship of the user with the product (e.g., that the user "owns" the product) or a feeling that the user has about the product (e.g. the user "likes," "wants," or "recommends" the product, or that the user has selected a "star rating" for the product or the product manufacturer). If it is determined that the user has selected a user interface element representing a product-related social signal, the method of FIG. 2 proceeds to block 210, where the method, among other things, stores social signal information including, for example, a record of the user-selected social signal, in association with information identifying the associated product, and personal information for the user such as, for example, their name, gender, age, geographic location, and any other characteristics associated with the user. Such social signal information may, for example, be stored in a data repository or database that has been configured to efficiently store such information, and may be chosen to make access quicker, speeding processing of such data, such as the data repositories 68A or 80A of FIG. 1. The method of FIG. 2 then proceeds to block 204. If, however, it is determined at block 208 that the user did not select a user interface element representing a product-related social signal, the method of FIG. 2 continues at block 212.

At block 212, the system determines whether the user selected to purchase a product. If it is determined that the user did select to purchase a product, the method of FIG. 2 then proceeds to block 214, at which the method, among other things, stores social signal information including, for example, a record of the purchase of the product, in association with the personal information for the user, described above. If, however, the method determines that the user did not select to purchase a product, the method proceeds to block 204, described above.

Figure 3:
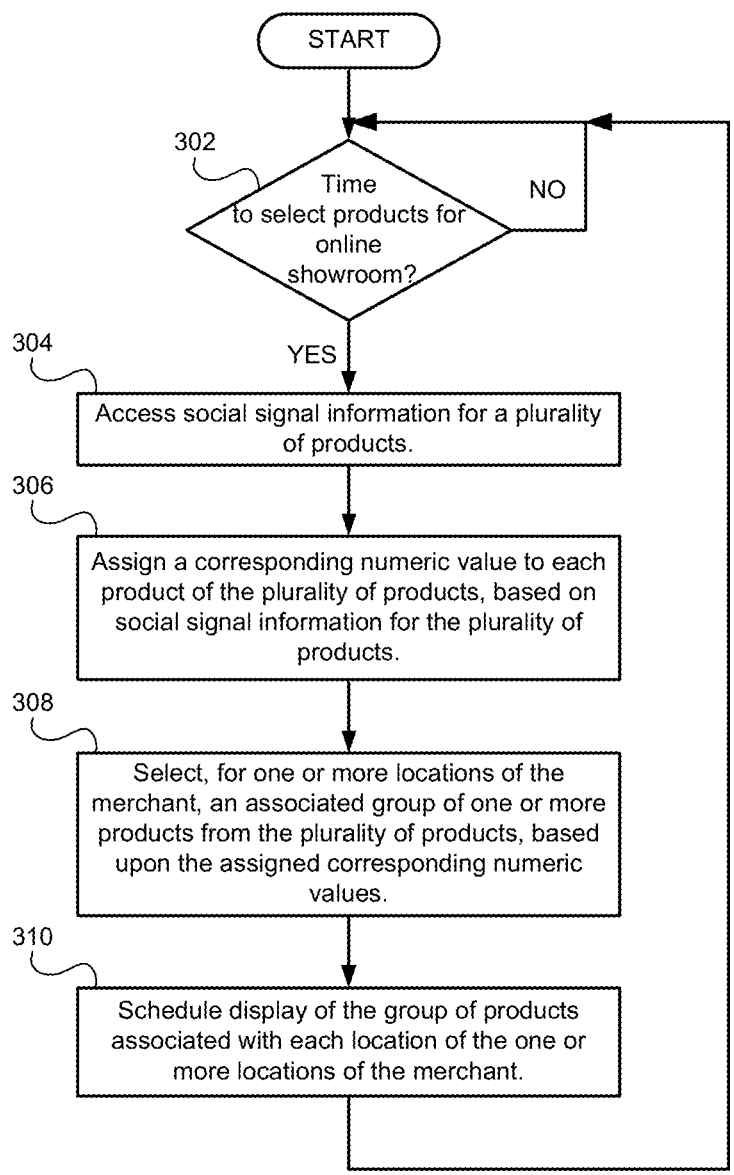
FIG. 3 is a flowchart illustrating an exemplary method of dynamically selecting a group of products for display in and purchase through an "online showroom," in accordance with a representative embodiment of the present disclosure.

FIG. 3 is a flowchart illustrating an exemplary method of dynamically selecting a group of products for display in and purchase through an "online showroom," in accordance with a representative embodiment of the present disclosure. The method of FIG. 3 may be performed by various elements of FIG. 1 including, by way of example and not limitation, the computer system 80 of FIG. 1. The following discussion of the method of FIG. 3 may make reference to various elements of the computer network of FIG. 1. It should be noted that the actions depicted in FIG. 3 have been limited to those that address specific aspects of operation of a system supporting dynamically selecting products to be displayed and sold to consumers in a hands-on environment, based upon social signals from an online environment, and that a system supporting the method of FIG. 3 may perform a greater number of actions and more features than discussed herein, without departing from the spirit and scope of the present disclosure.

The actions of the method of FIG. 3 begin at block 302, where a determination is made as to whether it is time to select a current set of products to be displayed in an "online showroom," in accordance with the present disclosure. It should be noted that the selection of such products may be done for one or more physical store locations of a merchant, or may be done for all physical store locations of the merchant, when such a determination is performed. It should also be noted that the same or different products may be selected for each physical store location, based on one or more parameters including, but not limited to, the geographic location of each physical store location, the respective popularity of various categories of products sold at each physical store location, socioeconomic information about the area surrounding each physical store location. If it is not yet time to perform selection of a new group of products for display in an "online showroom," the method of FIG. 3 simply loops at block 302. If, however, it is determine that it is time to select products, the method of FIG. 3 continues at block 304, where the system performing the method accesses social signal information for a plurality of products, as stored by the process depicted in FIG. 2. Such social signal information may, for example, be stored in a data repository or database, such as the 68A of FIG. 1.

Next, at block 306, the method of FIG. 3 may assign a corresponding numeric value to each product of the plurality of products, based on the social signal information for the plurality of products. For example, a representative embodiment of the present disclosure may tally the number of occurrences of user selection of a "Like" user interface element, a "Want" user interface element, or a "Have" user interface element associated with a particular product. The counts for user selection of each of the "Like," "Want," and "Have" user interface element for each of the plurality of products may be calculated, and those counts may be used directly, or weighted, in calculating and assigning a numeric value to each product for a particular period of time. The numeric value calculated for each product may then be used as an indicator of the level of social interest or engagement, or popularity, of the associated product, in an on-line or e-commerce environment. In some representative embodiments of the present disclosure, the calculation of the numeric value assigned to each product may be based on social signal information originating from within a certain proximity distance of each location of the merchant, to take into account the differing attractiveness of products to consumer within different geographic regions. In some representative embodiments of the present disclosure, the calculation of the numeric value assigned to each product may be based on particular personal characteristics of consumers that purchased each product, or selected particular user interface elements representing their own social signals or feeling about each of the products.

Next, at block 308, the method may select a group of one or more products from the plurality of products, for each of one or more physical locations of a merchant, based on the numeric values assigned to each of the products in the plurality of products. For example, the system performing the method of FIG. 3 may select a certain number of products taken from the products having assigned numeric values indicating the highest level of social interest or engagement, or popularity, or above a certain threshold for the physical location, which may vary by location. In some representative embodiments of the present disclosure, the number of products selected may depend, for example, on the amount of floor or display space available in the "online showroom" area of each merchant location. In addition, selection of products for display by a merchant location may depend upon the speed with which the vendor of a product is able to deliver the product to consumers within a certain distance proximity of the merchant location that will be displaying the product.

Next, at block 310, the method of FIG. 3 may schedule and make arrangements for display of the selected group of products associated with each location of the merchant. For example, such scheduling and arrangements may include arranging for production of signs, shelf-labels, updating of merchant transaction handling systems, mobile applications, and delivery by the supplier/vendor of the display models of products selected for display and sale at each of the merchant locations.

Figure 4:
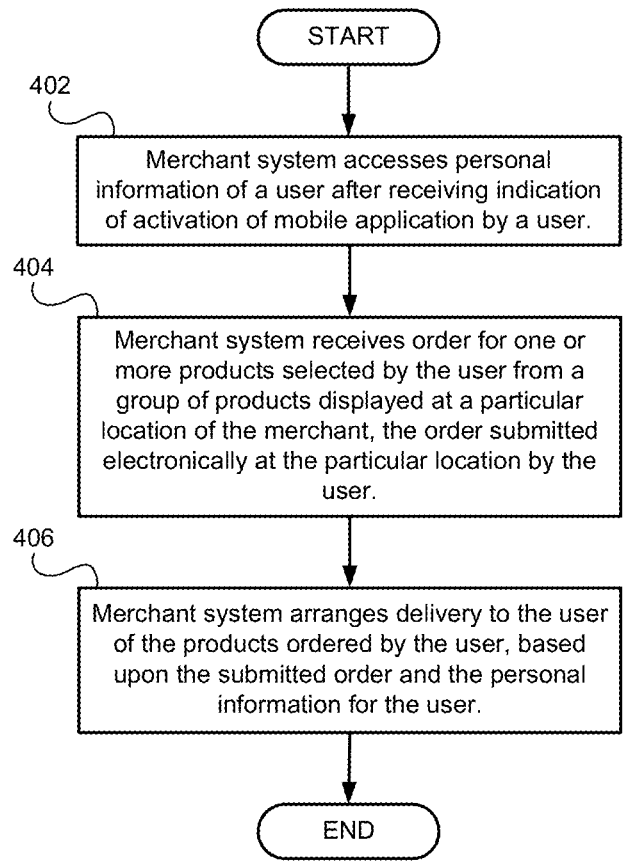
FIG. 4 is a flowchart illustrating an exemplary method of operating a system supporting a mobile application on a user device, in accordance with a representative embodiment of the present disclosure.

FIG. 4 is a flowchart illustrating an exemplary method of operating a system supporting a mobile application on a user device, in accordance with a representative embodiment of the present disclosure. The method of FIG. 4 may be performed by various elements of FIG. 1 including, by way of example and not limitation, the computer system 80 of FIG. 1 interacting with a user device such as, for example, the processing device 20" of FIG. 1. The following discussion of the method of FIG. 4 may make reference to various elements of the computer network of FIG. 1. It should be noted that the actions depicted in FIG. 4 have been limited to those that address specific aspects of operation of a system supporting dynamically selecting products to be displayed and sold to consumers in a hands-on environment, based upon social signals from an online environment, and that a system supporting the method of FIG. 4 may perform a greater number of actions and more features than discussed herein, without departing from the spirit and scope of the present disclosure.

The method of FIG. 4 begins at block 402, where a system such as the computer system 80 may access personal information of a user after receiving an indication of activation of a mobile software application (i.e., a mobile "app") on a user device, by a user. The mobile application supporting an embodiment of the present disclosure may, for example, have been installed by the user, by the maker of the user device, by a merchant, or by a third party. In a representative embodiment of the present disclosure, such a mobile application may enable a user to perform not only the actions described herein with regard to the details of browsing, selecting, and/or purchasing products and/or services from a merchant, but may also provide additional functionality enabling social interactions and text, voice, and video communication between the user and other users of a merchant system such as that described herein.

Next, at block 404, the system performing the method of FIG. 4 may receive an order for one or more products selected by a consumer/user from a group of products displayed at a particular "online showroom" of a location of a merchant. The order may be submitted by the consumer/user, electronically, from the "online showroom," from another location within the merchant location, or from the home or office of the consumer, using a personal electronic device of the consumer, or a kiosk of the merchant, the data communication infrastructure of the merchant location, a public wireless infrastructure, or a wired data communication infrastructure of any suitable type.

The order received by the system may, for example, result from user scanning of optical or radio frequency wireless identification devices associated with the product(s) of interest to the consumer such as, for example, using an image capture device of the user device used to capture an optical code (e.g., universal product code (UPC), Quick Response (QR®), or other 1-dimensional or 2-dimensional optically readable code printed on advertising materials or displayed on a display screen), or an electromagnetic signal received by circuitry in the user device using any of a variety of communication protocols (e.g., Bluetooth, Near-Field Communication, Wi-Fi, infra-red).

Next, at block 406, the system performing the method of FIG. 4 may arrange for delivery to the user of the product(s) ordered by the user, based upon the submitted order and the personal information for the user. The system may, for example, communicate information identifying the products ordered by the user, to the manufacturer of the product(s), to a vendor/wholesaler of the product(s), or to a centralized warehouse operated by the merchant.

Figure 5:
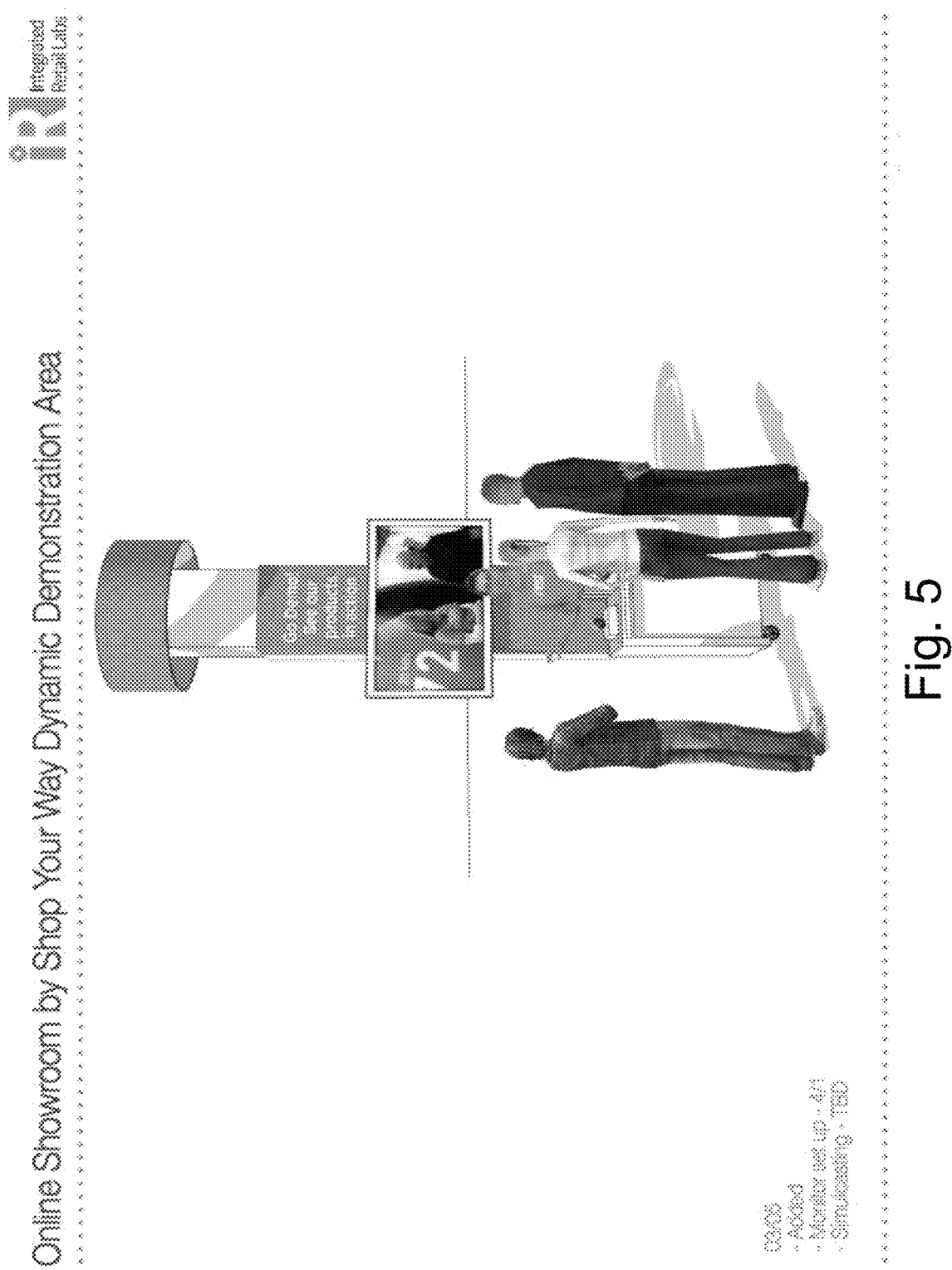
FIG. 5 is an illustration of an exemplary demonstration area at which product demonstrations may be performed, in accordance with a representative embodiment of the present disclosure.

FIG. 5 is an illustration of an exemplary demonstration area at which product demonstrations may be performed, in accordance with a representative embodiment of the present disclosure. As previously disclosed, the product demonstrations may, for example, be streamed live to various sites within a merchant location, to other merchant locations, and/or online for viewing by consumers on their own user devices.

Figure 6:
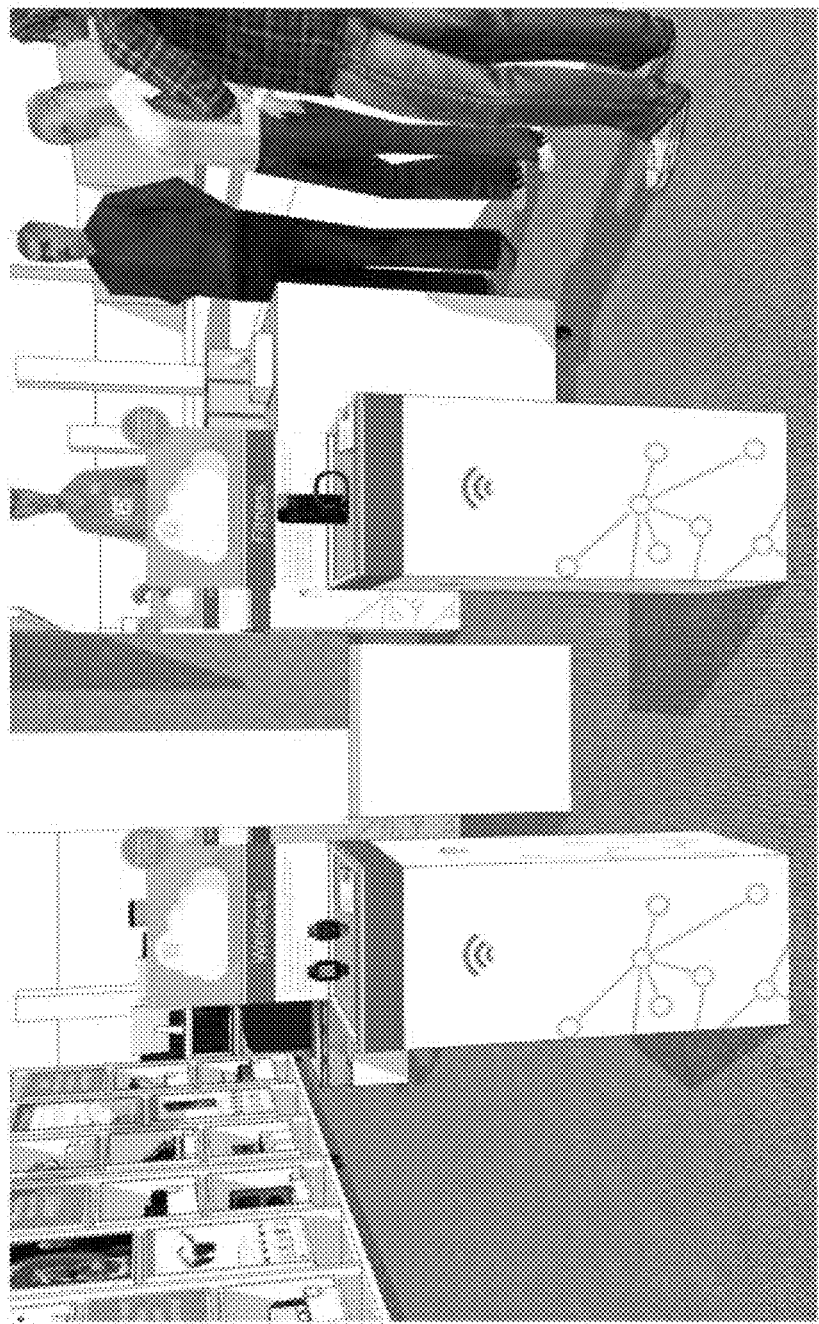
FIG. 6 is an illustration of another exemplary demonstration area at which products may be displayed and demonstrated, in the manner described with respect to FIG. 5, in accordance with a representative embodiment of the present disclosure.

FIG. 6 is an illustration of another exemplary demonstration area at which products may be displayed and demonstrated, in the manner described with respect to FIG. 5, in accordance with a representative embodiment of the present disclosure.

Figure 7:
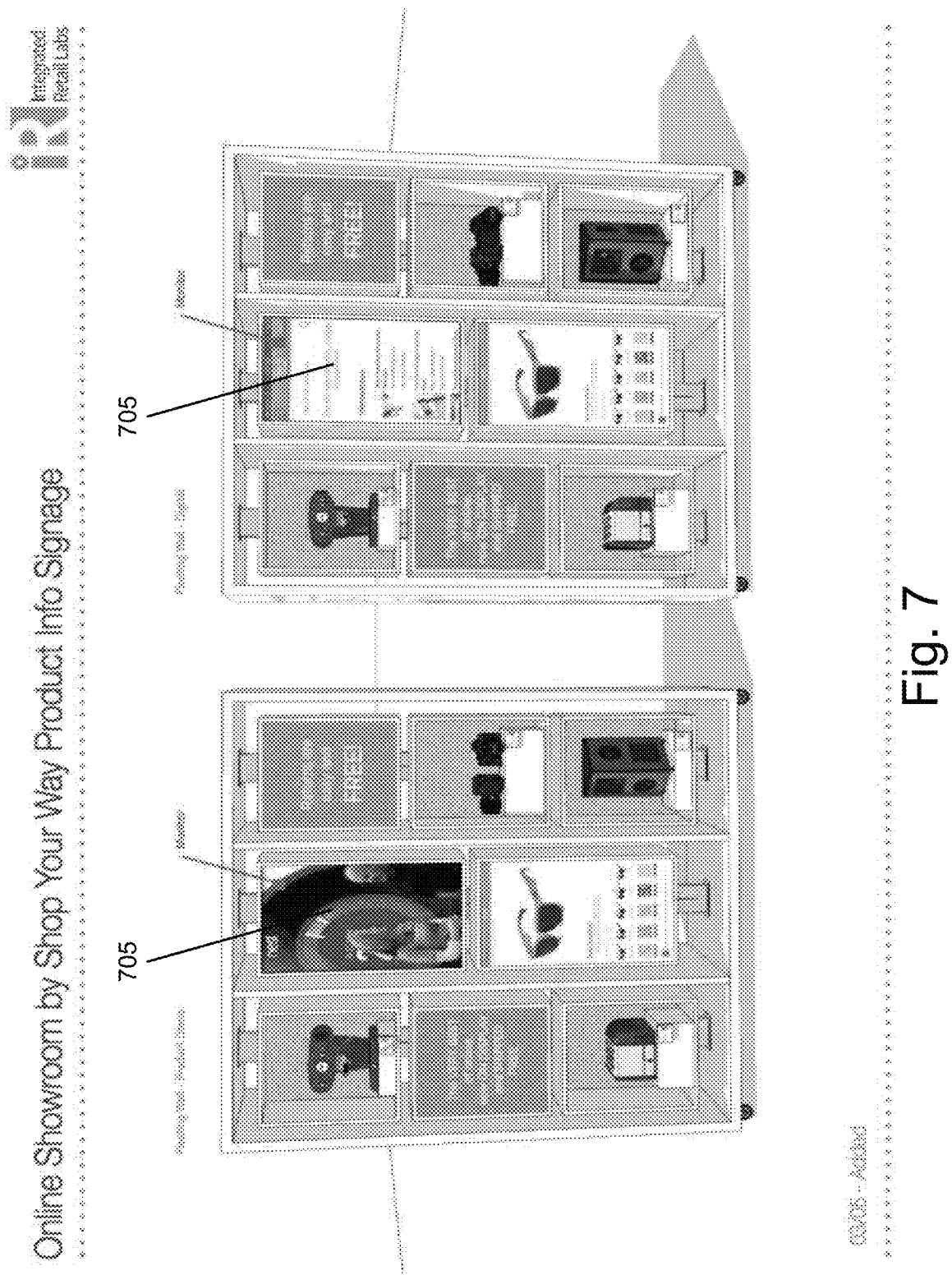
FIG. 7 is an illustration of an exemplary product display area of an "online showroom," in accordance with a representative embodiment of the present disclosure.

FIG. 7 is an illustration of an exemplary product display area of an "online showroom," in accordance with a representative embodiment of the present disclosure. As illustrated in FIG. 7, the example product display area of a representative embodiment of the present disclosure may include one or more products on display or for demonstration, with which consumers can interact. In addition, consumers may scan product information and purchase the product(s) they select for shipment to their home, office, or to friends or relatives. FIG. 7 illustrates the use of one or more display screens or monitors 705 used to bring help bring product information to the online showroom as soon as each product is selected, as described above, and all arrangements have been made for processing of product purchases and delivery. This enables a system of the present disclosure to quickly display pictures and information for products that have been automatically selected for sale based upon social signals recently acquired from consumers in an online environment. In this way, consumers may learn about, touch, use, and purchase products selected in this manner, as soon as arrangements have been made for various merchant systems to accept and process orders, as described above.

Such display screen or monitors 705 may be communicatively coupled to a locally or remotely located system such as, for example, computer system 80 of FIG. 1, that may perform the selection of products for each online showroom, as described herein, to enable the system to show still images and video of the selected product(s) in the online showroom, along with pre-recorded or live product demonstrations, in a manner that is highly responsive to consumer sentiment, as reflected in the social signals communicated in an online environment. In some representative embodiment of the present disclosure, the digital display(s) may display a graphical code (e.g., a QR or other visible code) for one or more of the selected products, to enable the consumer to capture and access information about products of personal interest using, for example, a mobile software app on their own personal electronic device, or a device provided by the merchant. The consumer may then purchase the product(s) of interest using the captured product information, and may arrange to have their purchases shipped to their home, office, relative, and/or friend. A representative embodiment of the present invention offers significant benefits to a merchant, in that it enables a merchant to begin selling products within one or more physical store locations before the physical inventory of a product is actually available in the store, and enables the merchant to quickly offer products from vendors who have insufficient product inventory to stock merchant multiple physical store locations in a conventional manner. Further, the merchant may offer the consumer the option to buy products in a self-service experience within a retail store, without the need to carry their purchases from the store.

Figure 8:
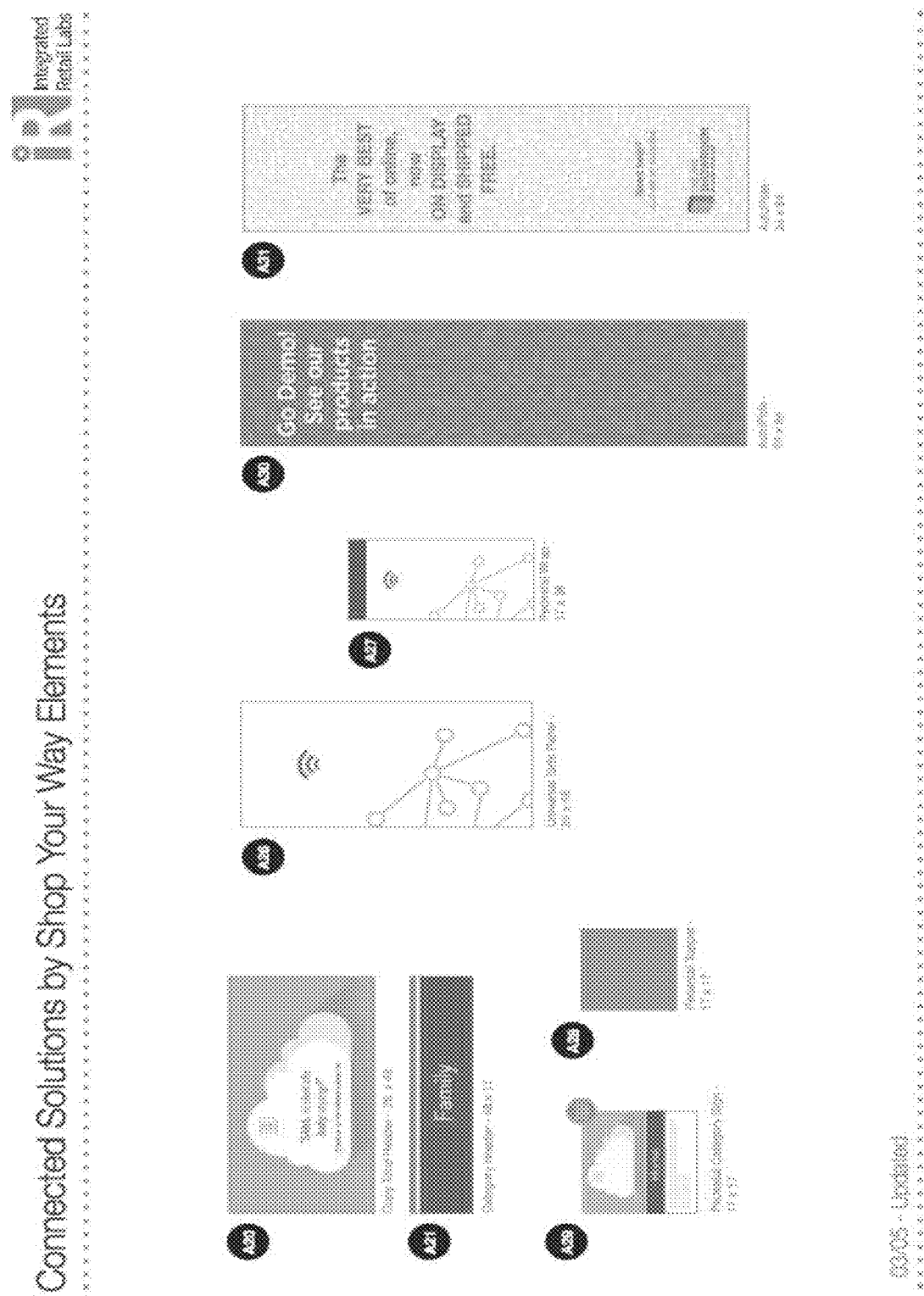
FIG. 8 is an illustration of exemplary signage that may be used to identify various features of an "online showroom," in accordance with a representative embodiment of the present disclosure.

FIG. 8 is an illustration of exemplary signage that may be used to identify various features of an "online showroom," in accordance with a representative embodiment of the present disclosure.

Figure 9:
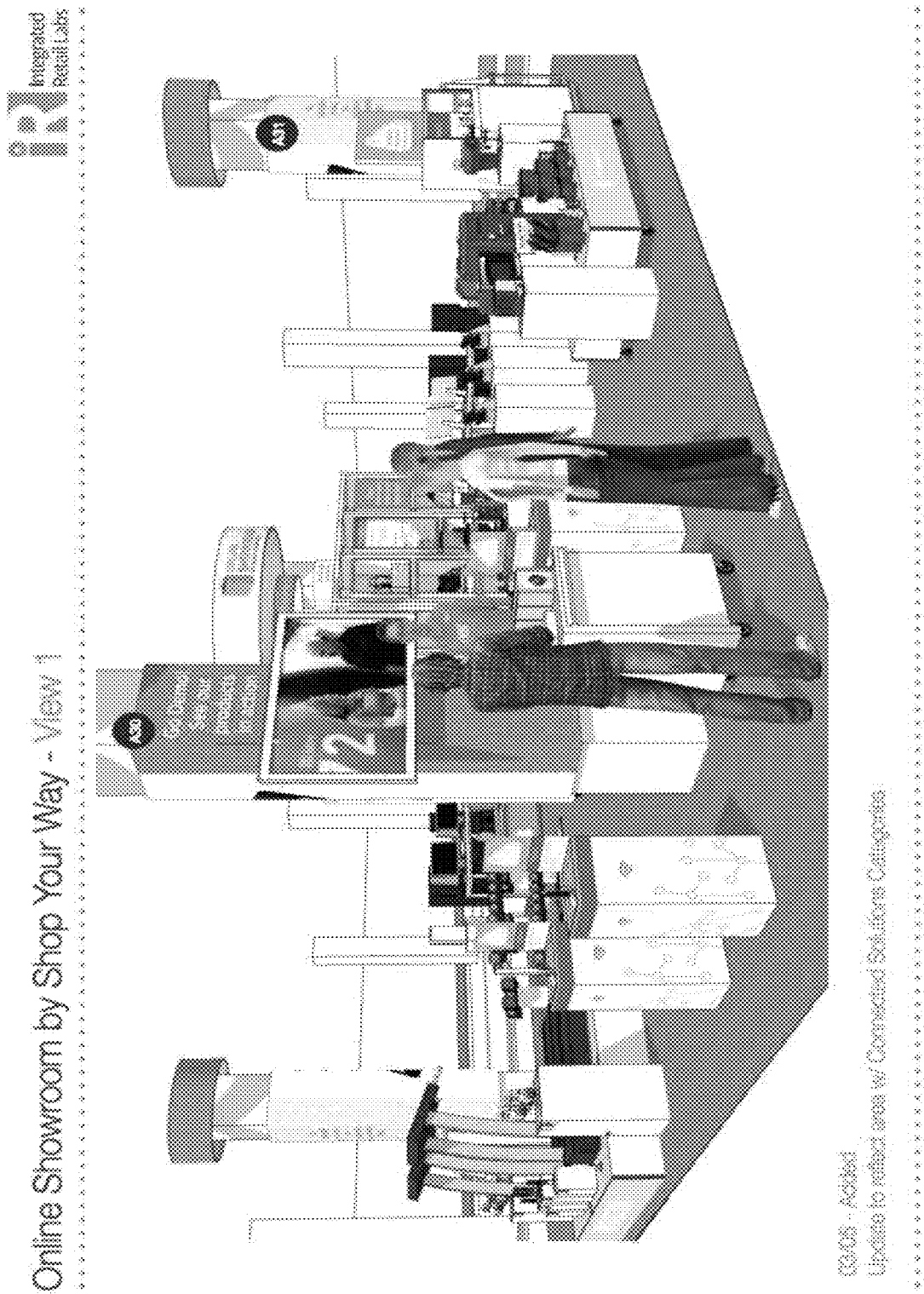
FIG. 9 an illustration of yet another exemplary demonstration area at which products may be displayed and demonstrated, in the context or the larger "online showroom," in the manner described with respect to FIG. 5, in accordance with a representative embodiment of the present disclosure.

FIG. 9 an illustration of yet another exemplary demonstration area at which products may be displayed and demonstrated, in the context or the larger "online showroom," in the manner described with respect to FIG. 5, in accordance with a representative embodiment of the present disclosure.

Figure 10:
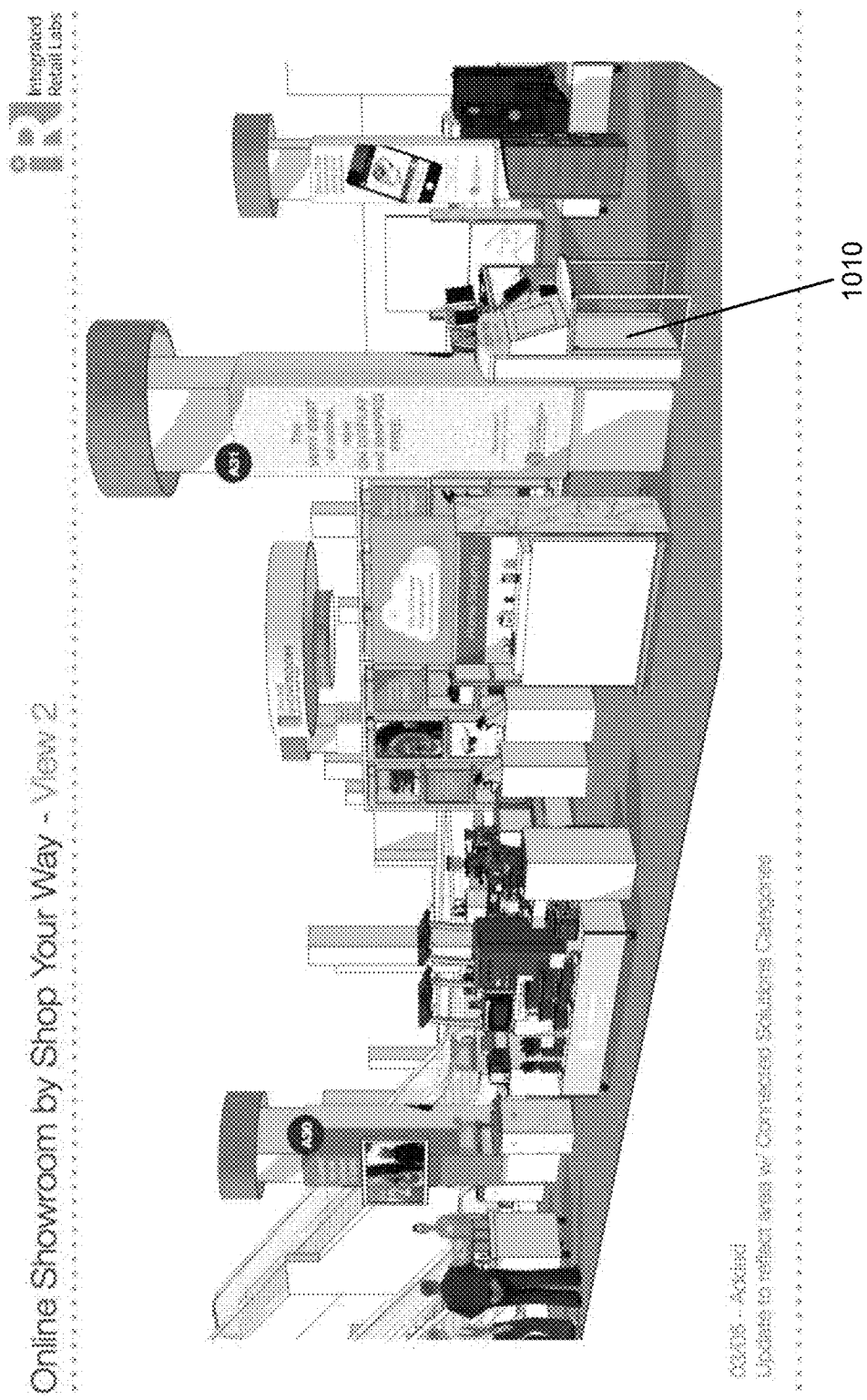
FIG. 10 is an illustration of an "online showroom" including a kiosk, a demonstration area, and product display areas, in accordance with a representative embodiment of the present disclosure.

FIG. 10 is an illustration of an "online showroom" including a kiosk 1010, a demonstration area, and product display areas, in accordance with a representative embodiment of the present disclosure. In the example of FIG. 10, the kiosk 1010 is equipped to scan an optical or electromagnetic identification device (e.g., a QR code, a bar code, or a device using radio frequency, infrared, or other wireless technology) to enable the consumer to make a purchase from the selected products are available on within the online showroom. The consumer may also choose to use their own personal electronic device (e.g., a suitably equipped cellphone, smart phone, handheld computer, or other device) with a mobile software app to access product information and make purchases of product items of interest. In some representative embodiments of the present disclosure, the mobile software app may be activated to display the presence or location, within a merchant physical store location, of an online showroom as described herein, when the consumer is located within a certain proximity distance of the physical merchant store location, or the within a certain proximity distance of the online showroom of a merchant location having such a facility. In addition, in a representative embodiment of the present disclosure, a mobile software app on an electronic device of the user may automatically activate a guidance function that automatically calculates a path or route through the merchant store location to the online showroom, upon the arrival of the consumer at the merchant location. In such an embodiment, the path or route may be customized for each consumer using personal information for the consumer maintained by the merchant. An example of such functionality may be found in U.S. patent application Ser. No. 13/971,431, filed Aug. 20, 2013, the entire subject matter of which is hereby incorporate herein by reference.

Figure 11:
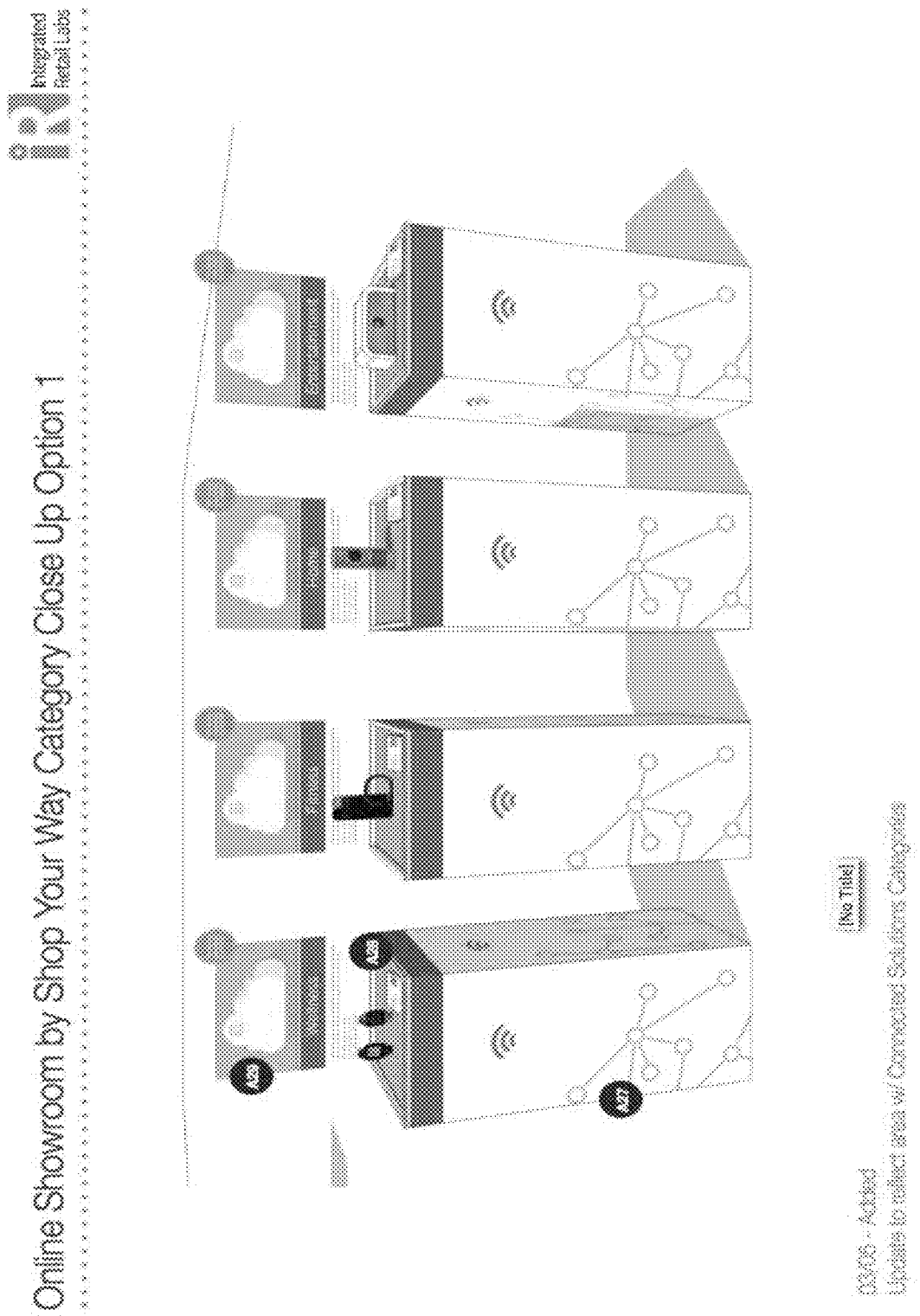
FIG. 11 is an illustration of an additional exemplary product display arrangement, in accordance with a representative embodiment of the present disclosure.

FIG. 11 is an illustration of an additional exemplary product display arrangement, in accordance with a representative embodiment of the present disclosure.

Figure 12:
FIG. 12 is an illustration of yet another exemplary product display arrangement, in accordance with a representative embodiment of the present disclosure.

FIG. 12 is an illustration of yet another exemplary product display arrangement, in accordance with a representative embodiment of the present disclosure.

Figure 13:
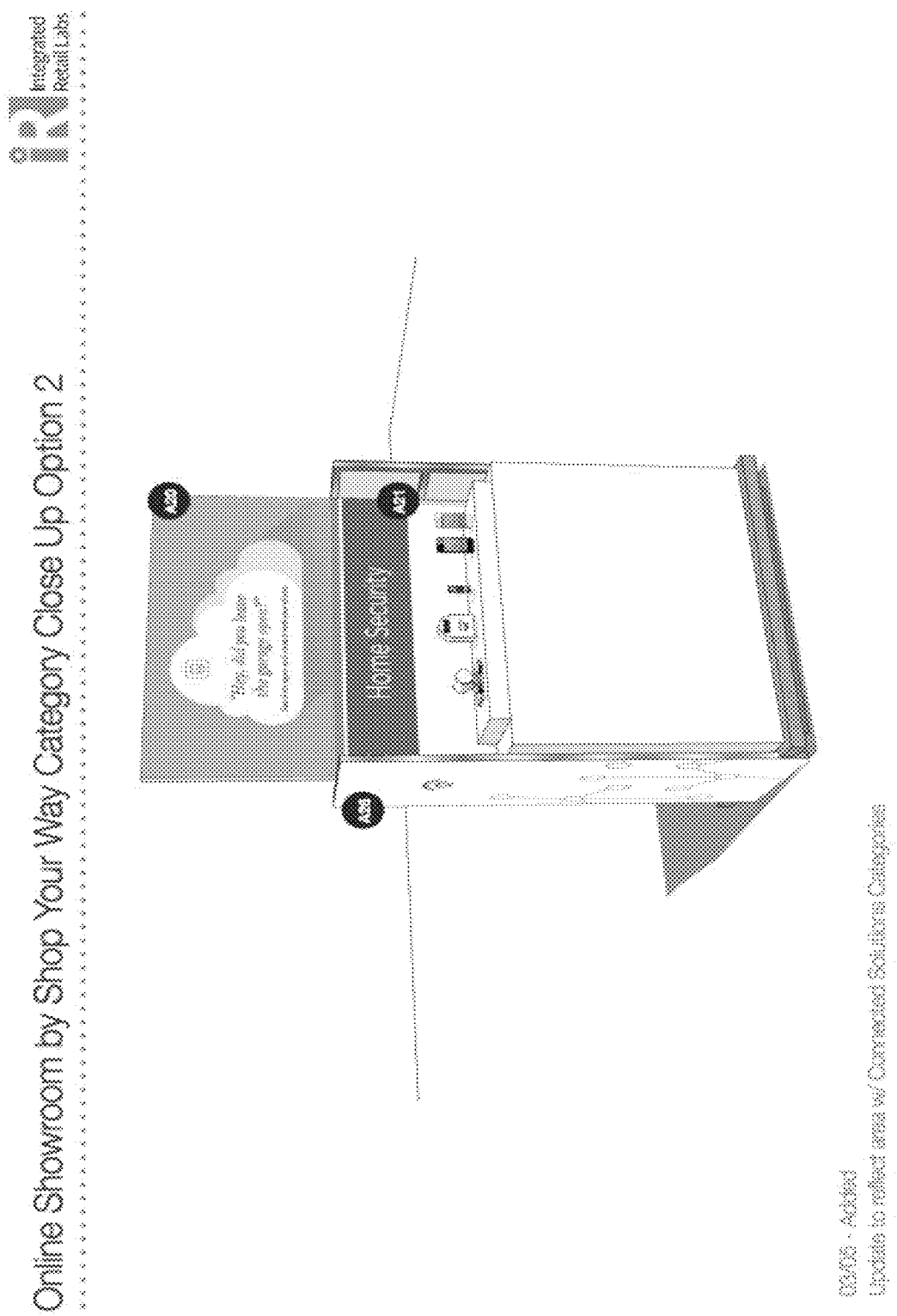
FIG. 13 is an illustration of an exemplary product display arrangement, in accordance with a representative embodiment of the present disclosure.

FIG. 13 is an illustration of an exemplary product display arrangement, in accordance with a representative embodiment of the present disclosure.

Figure 14:
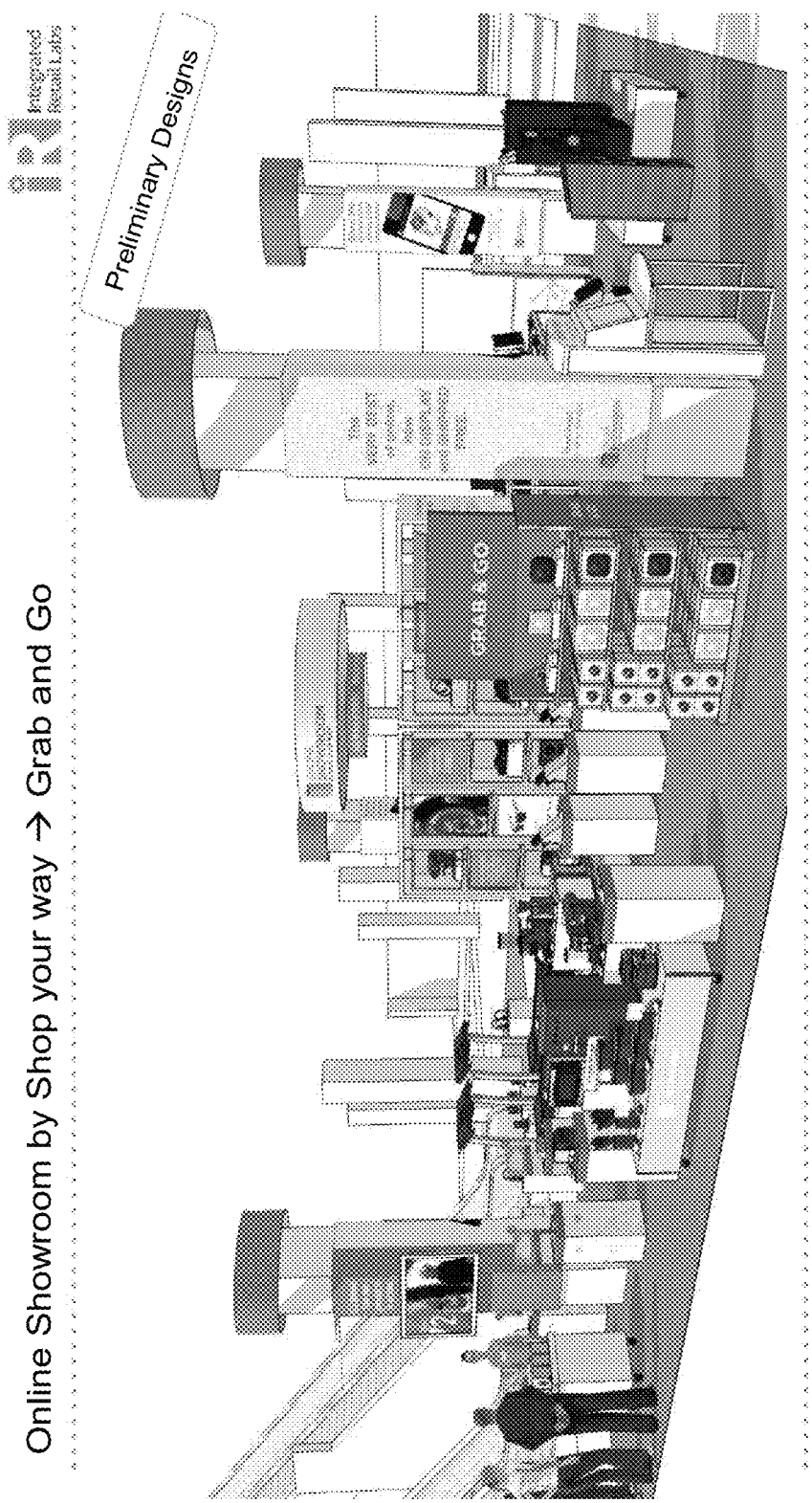
FIG. 14 is an illustration of an exemplary product display arrangement, including a demonstration area, and a "Grab & Go" area for products immediately available for purchase, in accordance with a representative embodiment of the present disclosure.

FIG. 14 is an illustration of an exemplary product display arrangement, including a demonstration area, and a "Grab & Go" area for products immediately available for purchase, in accordance with a representative embodiment of the present disclosure.

Figure 15:
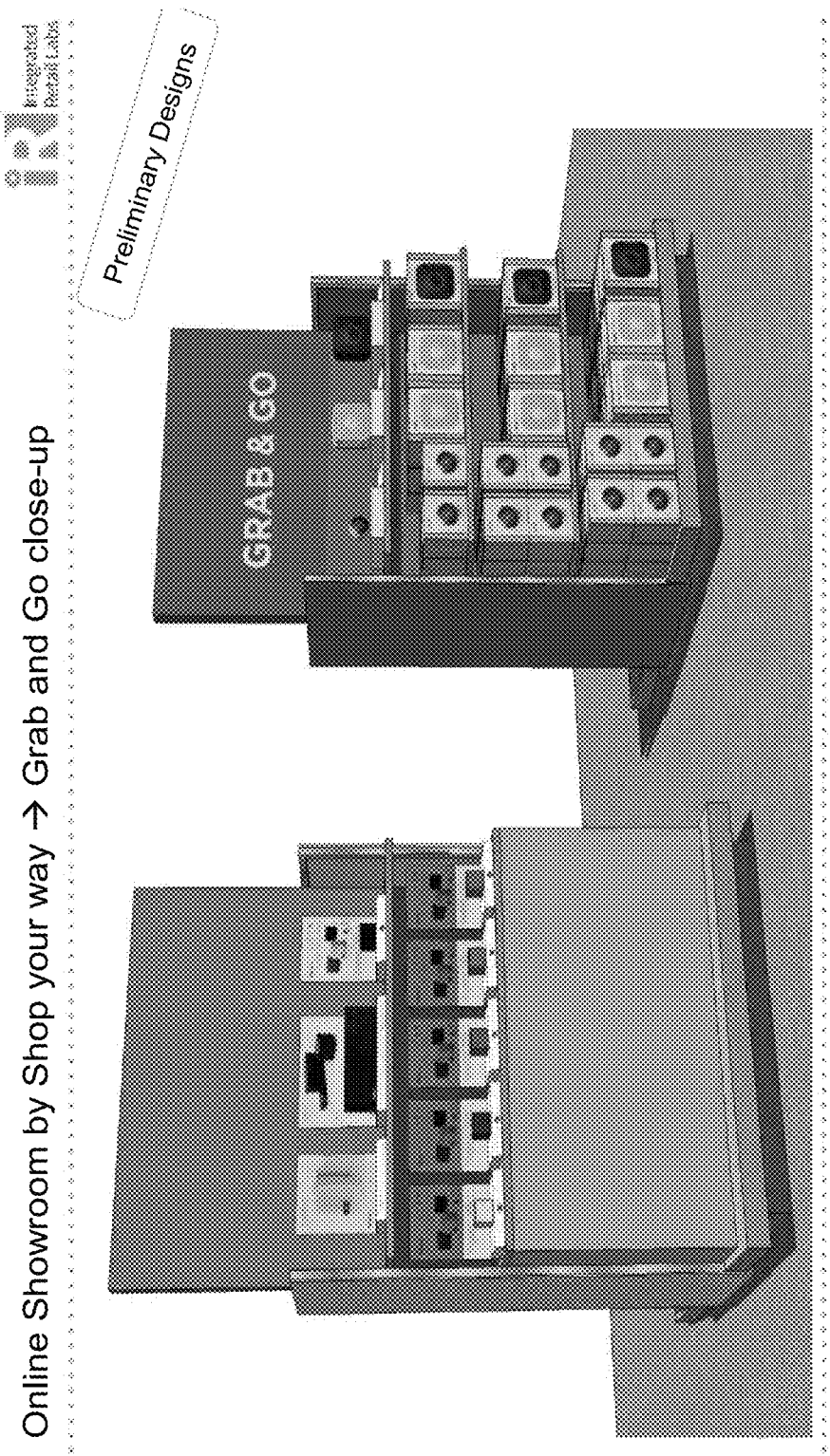
FIG. 15 is an isolated illustration of a "Grab & Go" product display arrangement, in accordance with a representative embodiment of the present disclosure.

FIG. 15 is an isolated illustration of a "Grab & Go" product display arrangement, in accordance with a representative embodiment of the present disclosure.

Figure 16:
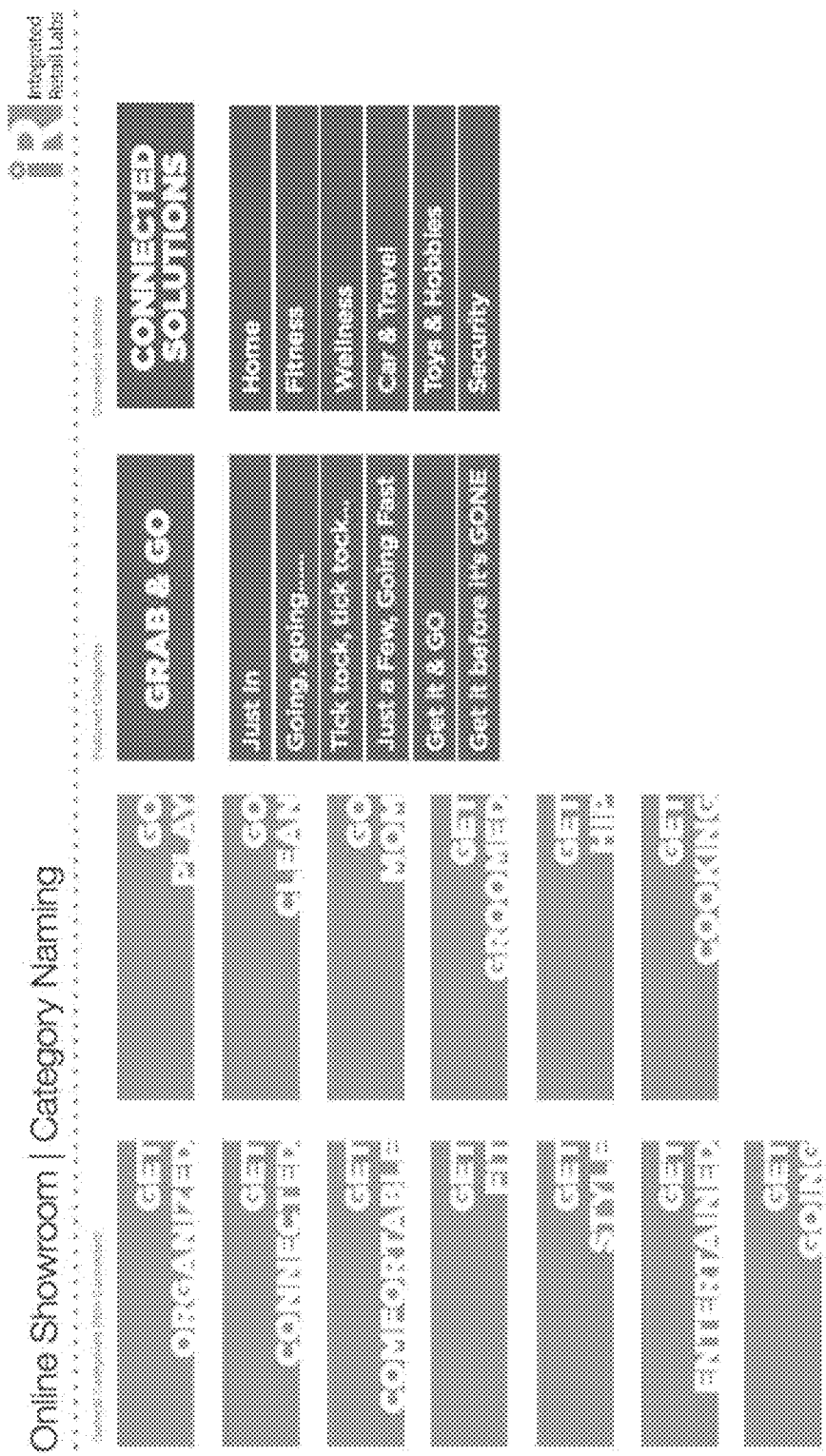
FIG. 16 is an illustration of exemplary categories in which products may be organized for display in an "online showroom," in accordance with a representative embodiment of the present disclosure.

FIG. 16 is an illustration of exemplary categories in which products may be organized for display in an "online showroom," in accordance with a representative embodiment of the present disclosure.

Figures 17A, 17B, 17C, 17D, 17E:
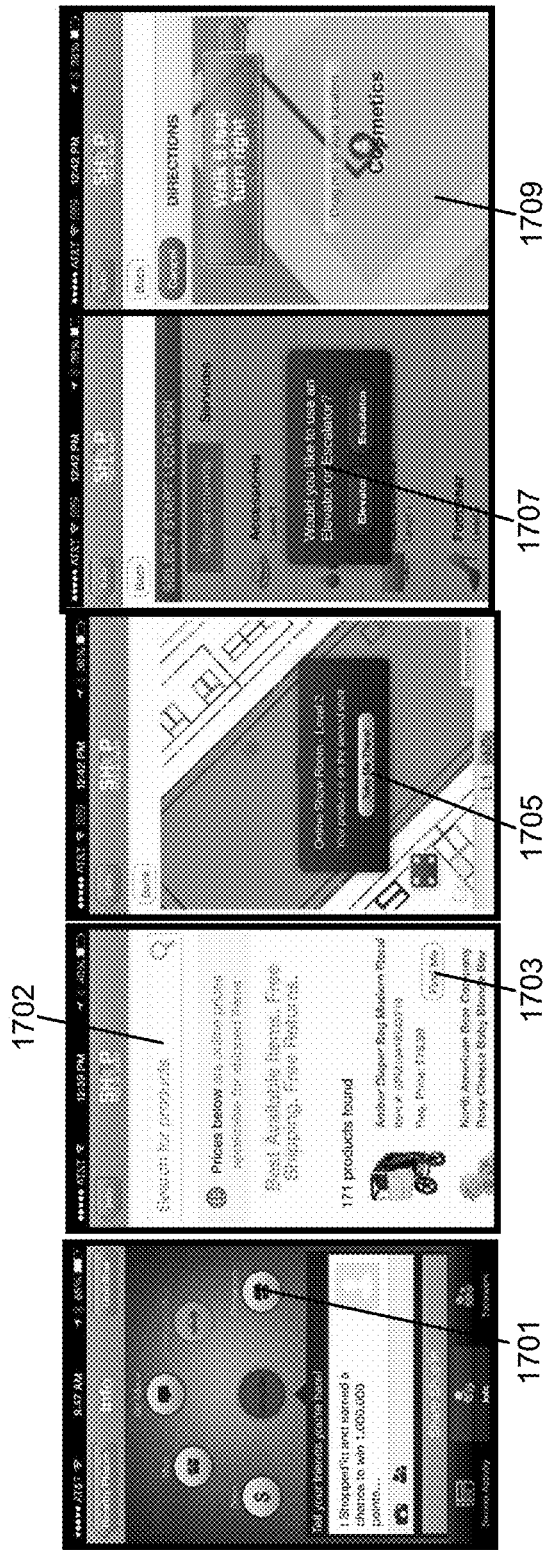
FIGS. 17A-17E illustrates aspects of a mobile software application for a user device such as, for example, the processing device of FIG. 1, that support consumer access to an "online showroom" at a physical merchant location, in accordance with a representative embodiment of the present disclosure.

FIGS. 17A-17E illustrates aspects of a mobile software application for a user device such as, for example, the processing device 20" of FIG. 1, that support consumer access to an "online showroom" at a physical merchant location, in accordance with a representative embodiment of the present disclosure. FIG. 17A illustrates an exemplary screen that provides a Showroom button 1701 that permits user access to information about the "online showroom" area of a physical merchant location to which the user of the mobile software application ("app") has chosen to "shop-in" (i.e., identify themselves with respect to a particular location of the merchant), in accordance with a representative embodiment of the present disclosure. In a representative embodiment of the present disclosure, access to the screens shown in FIG. 17A-17E and FIG. 18A-18C, discussed below, may be enabled when the mobile software app running on the user device detects that the user is located within an electronic boundary or "geo-fence" at a merchant location having an online showroom as described herein. The user may be notified of any live product demonstrations in progress at a merchant location, when they are detected to be present at the merchant location. The user may then choose to view the product demonstration directly on their user device via the mobile software app, or may request directions routing them to the location of the live product demonstration in the merchant location. The user may also be provided, via the mobile software app, with quick access to a schedule of demonstrations of the products promoted in the online showroom at their present merchant location, to enable the user to plan to view product demonstrations in person. When the user with a mobile device is within the "geo-fence", they may also be enabled, via the mobile software app on their mobile device, to view a live video stream of the demonstration of various products by a product representative (e.g., manufacturer's representatives, or employee(s) of the merchant) directly on their mobile device. In a representative embodiment of the present disclosure, the user may be enabled to immediately purchase the product being demonstrated over the live video stream, directly from within the mobile software app used for viewing the product demonstration. In some representative embodiments of the present disclosure, users that are currently located away from the physical merchant location at which the live demonstration is taking place, but who have chosen to "shop-in" at that physical location of the merchant, may also be enabled to view the live streaming video of the product demonstration on their mobile user device via the mobile software application.

FIG. 17B illustrates an exemplary screen showing search functionality, including a "find me" user interface element 1703 that is associated with each of the products found by the search, and which permits a user to request the location within the selected physical merchant location at which the product item associated with the "find me" user interface element 1703 may be found, in accordance with a representative embodiment of the present disclosure. The user may enter into the search box 1702, various words or phrases descriptive of the item sought by the user.

FIG. 17C illustrates an exemplary search results screen, which offers the user the opportunity to request in-store directions from the current location of the user to the search-for product item, in accordance with a representative embodiment of the present disclosure. In accordance with a representative embodiment of the present disclosure, an illustration of the area of the physical merchant location in which the product item of interest to the user may be displayed, along with a textual description of the location of the desired product item. As shown in FIG. 17C, the user may request assistance in moving to the location of the desired using a "Take me there" user interface element 1705.

FIG. 17D illustrates an exemplary user interface screen to permit the user to identify acceptable features (e.g., elevator or escalator) along the path to the searched-for product item, in accordance with a representative embodiment of the present disclosure. In the illustration of FIG. 17D, the user is presented with a user interface element 1707 that offers the option to use either an elevator or an escalator of the merchant location building in the calculation of a route or path from their current location to the location in the merchant building at which the desired product item is located.

FIG. 17E illustrates an exemplary screen presenting directions to a user, in accordance with a representative embodiment of the present disclosure. The illustration of FIG. 17E shows an overhead view 1709 of the calculated path from the current estimated location of the consumer to the product of interest.

Figure 18C:
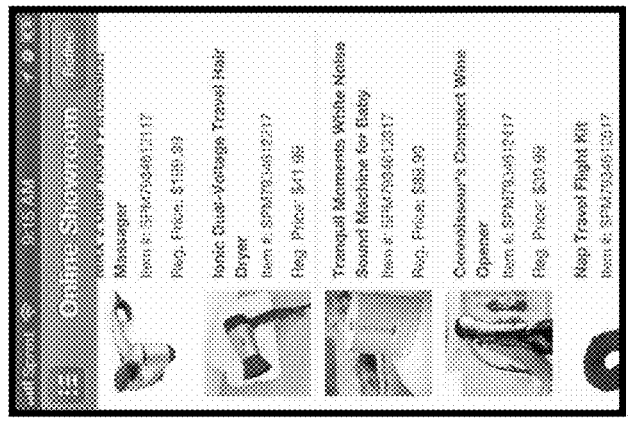
FIGS. 18A-C is an illustration of the use of a "Showroom" feature of a mobile application on a user device, to access information about products available through an "online showroom" of a selected merchant location, in accordance with a representative embodiment of the present disclosure.
Figure 18B:
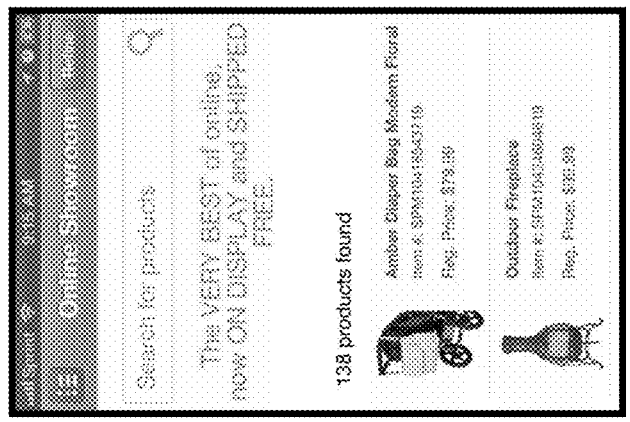
Figure 18A:
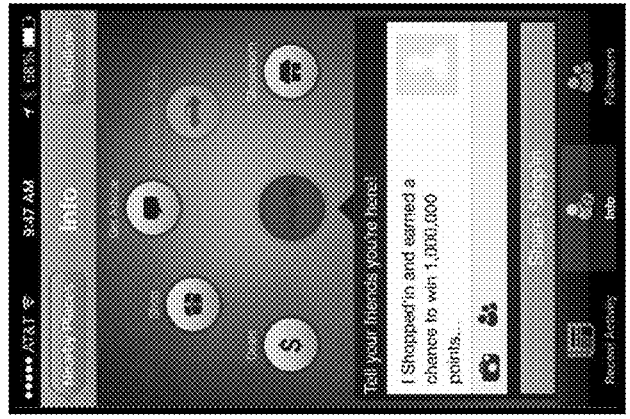

FIGS. 18A-C is an illustration of the use of a "Showroom" feature of a mobile application on a user device, to access information about products available through an "online showroom" of a selected merchant location, in accordance with a representative embodiment of the present disclosure.

Figure 19:
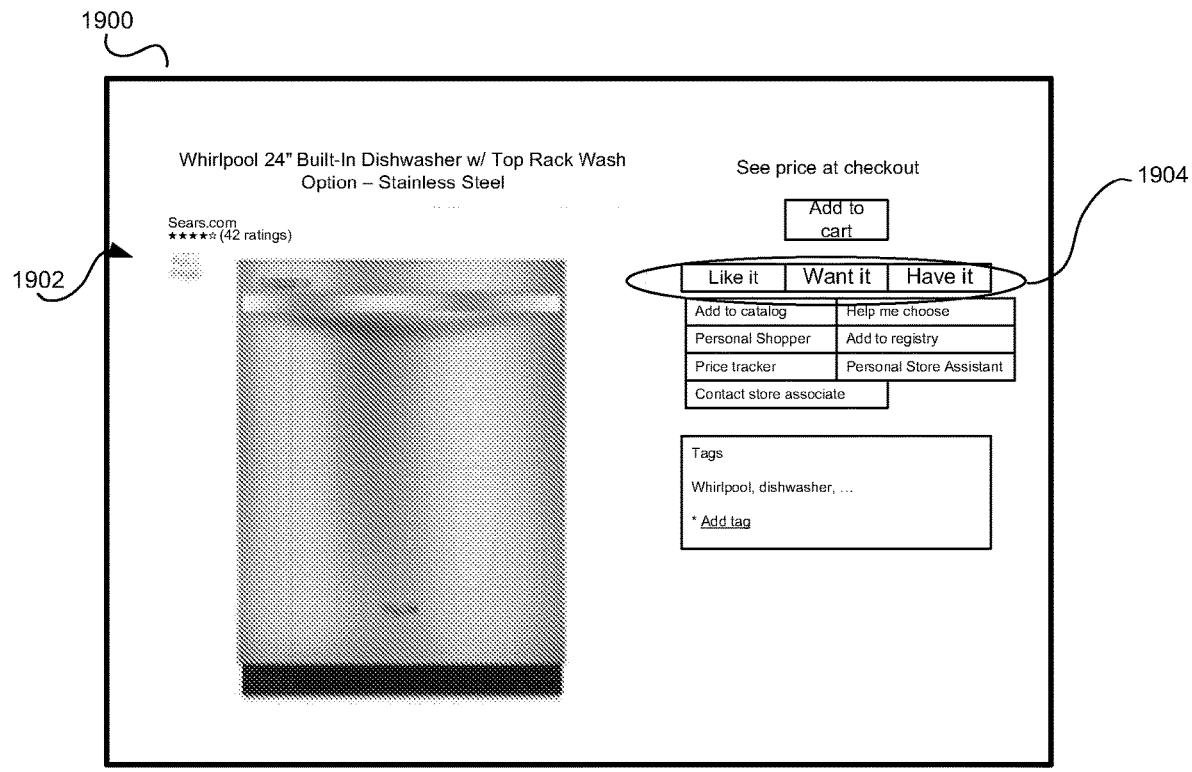
FIG. 19 is an illustration of exemplary screen image of pictorial and textual information for a product, and user interface elements for selecting example social signals representing the relationship with or feelings of the user about the associated product, in accordance with a representative embodiment of the present disclosure.

FIG. 19 is an illustration of exemplary screen image 1900 of pictorial and textual information for a product 1902, and user interface elements 1904 for selecting example social signals representing the relationship with or feelings of the user about the associated product 1902, in accordance with a representative embodiment of the present disclosure. Although the example of FIG. 19 shows specific icons for social signals representing that the viewer likes the associated product (i.e., "Like It"), that the viewer wants the associated product (i.e., "Want It"), and that the consumer already owns the associated product (i.e., "Have It" or "Own It"), these illustrative examples should not be taken as limiting the breadth and variety of social signals that may be used in the process of selecting products and/or services for an online showroom as described herein. Social signals may also be derived from other forms of input from users such as, for example, information derived from comments about or reviews of products submitted by users. In such a representative embodiment of the present disclosure, a computer system such as computer system 80 of FIG. 1 may be configured with suitable software applications, memory, and communication capabilities to enable the system to gather and process communications between users of, and/or product comments and review submissions of users of various social networks and/or social e-commerce network. Such processing may include analyzing various product and nonproduct related comments, submissions, and inter-user communications to identify facts, opinions, and/or feelings voiced by users that relate to products that may be candidates for inclusion in an online showroom according to the present disclosure. Such analysis may include, by way of example and not limitation, natural language processing of such comments, submissions, and/or inter-user communications. In addition, a system in accordance with the present disclosure may similarly analyze commercial publications such as magazines, and newspapers, blogs and chatrooms, and merchant websites, to identify candidate products and/or services, and consumer sentiment about such products and/or services, to identify candidates for inclusion in an online showroom in accordance with the present disclosure.

Figure 20:
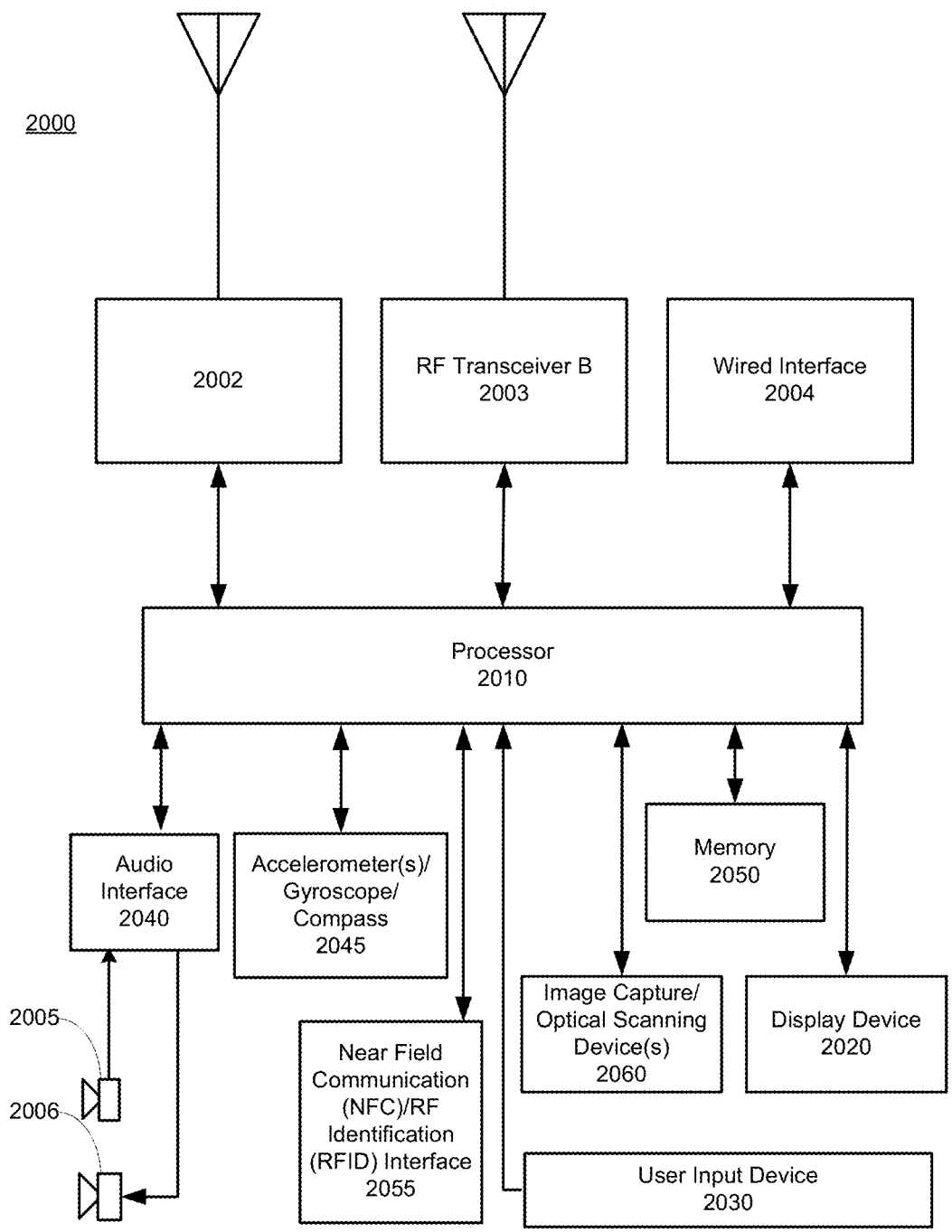
FIG. 20 is a block diagram illustrating a personal electronic device that may correspond, for example, to electronic devices shown in FIG. 1, in accordance with a representative embodiment of the present disclosure.

FIG. 20 is a block diagram illustrating a personal electronic device 2000 that may correspond, for example, to electronic devices 20, 20', 20" shown in FIG. 1, in accordance with a representative embodiment of the present disclosure. The personal electronic device 2000 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 20, the personal electronic device 2000 includes a processor 2010, an RF transceiver A 2002, an RF transceiver B 2003, a wired interface 2004, a display device 2020, a user input device 2030, an audio interface 2040, one or more accelerometers, gyroscopes, or compasses 645, a memory 2050, near field communication (NFC)/radio frequency identification (RFID) interface 655, and an image capture/optical scanning device 660. The processor 2010 may be, for example, a suitable microprocessor or microcomputer having sufficient computing power to control the personal electronic device 2000, and is operably coupled to the RF transceiver A 2002, the RF transceiver B 2003, and the wired interface 2004. The RF transceiver A 2002 and RF transceiver B 2003 may comprise any necessary circuitry, logic, and software/firmware for wireless communication over any of, for example, the cellular, Bluetooth, Wi-Fi (e.g., IEEE 802.11a/b/g/n/ac), Zigbee, WiMAX, NFC (Near Field Communication), radio frequency identifier (RFID), or any other wireless network known now or in the future. The wired interface 2004 may comprise any necessary circuitry, logic, and software/firmware for wired communication over any of, for example, an Ethernet, Universal Serial Bus, FireWire (IEEE 1394) or other wired networks known now or in the future.

The processor 2010 is also operably coupled to the memory 2050, and may be used for non-transitory storage of executable program instructions, parameters, and data for any of the circuitry of the personal electronic device 2000. The display device 2020 is also operably coupled to the processor 2010, and may comprise, for example, one or more LED, OLED, LCD, or other form of visual display capable of presenting text or graphics, and may comprise any circuitry, logic, or software/firmware to support, for example, a graphical user interface (GUI). The user input device 2030 may comprise, for example, suitable switches, buttons, or touch sensitive surfaces to enable user control and operation of the personal electronic device 2000, and may comprise any necessary circuitry, logic, and software/firmware to allow it to perform those functions. In a representative embodiment of the present disclosure, the user input device 2030 may be a touch sensitive surface at the viewing side of the display device 2020, enabling a user to use the touch sensitive surface of the display device to enter user inputs and respond to displayed information. The audio interface 2040 comprises any necessary circuitry, logic, and software to interface a microphone 2005 and a speaker 2006 to the processor 2010. In some representative embodiments of the present invention, the processor 2010 may be operably coupled to a NFC/RFID interface 2055 that may be used to communicate with, by way of example and not limitation, NFC/RFID-enabled electronic shelf labels (ESLs), credit and identification cards and badges, tags, keychain fobs, and any other devices having NFC and/or RFID communication capability. In addition, the processor 2010 may be operably coupled to an image capture/optical scanning device 2060 that may include, by way of example and not limitation, a monochrome or color digital imaging device, a digital camera, an infrared receiver, and/or a scanner capable of detecting light signals representative of bar codes (e.g., UPC), two-dimensional codes (e.g., a QR code), images, or other forms of optical information known now or in the future.

Aspects of the present disclosure may be seen in a method of dynamically selecting products for presentation to consumers in a hands-on environment of a merchant, based upon social signals acquired from consumers in an online environment. Such a method may be performed in a computer system communicatively coupled to memory configured to store information identifying one or more products in association with social signals representative of expressions of consumer sentiment corresponding to the one or more products. Such a method may comprise capturing in the memory, from a stream of information representing product related interactions of a plurality of users with a merchant web site, information identifying a product of each product related interaction and personal information of a user associated with each product related interaction, wherein the personal information comprises sentiment information expressed by the associated user towards the product of the associated product related interaction. The method may also comprise assigning a corresponding numeric value to each unique product identified from the stream of information representing product related interactions, based on the sentiment information expressed by users in the product related interactions involving the unique product. In addition, such a method may comprise selecting, for each of one or more physical locations of the merchant from the unique products identified from the stream of information representing product related interactions, an associated group of one or more products to be sold, based on the numeric values assigned to each of the unique products. The method may further comprise transmitting, to each of the one or more physical locations of the merchant, product information for products from the associated group of one or more products, the product information comprising product images for display to consumers.

In a representative embodiment of the present disclosure, the sentiment information expressed by each user may comprise an indication of user selection of a user interface element associated with a product on a web page. The selected user interface element may represent one of user expression of liking the associated product, user expression of wanting the associated product, user expression of owning the associated product, and user purchase of the associated product. The selecting of the associated group of one or more products for each of the one or more physical locations of the merchant may be performed at intervals of time determined based on a number of unique products identified in the stream of information representing product related interactions. The product information for the associated group of one or more products may comprise information for configuring a self-service terminal to enable purchase at particular physical location of the merchant of a product from the group of one or more products associated with the particular physical location of the merchant. The product information for products from the group of one or more products associated with a physical location of the merchant may be transmitted to a user terminal device at the physical location of the merchant subject to detection of the user terminal device within a certain proximity distance of the physical location of the merchant. The stream of information representing product related interactions of the plurality of users with the merchant web site may comprise one selected from the following: a product review submitted by a consumer, a product related message communicated from one consumer to another consumer, and an indication of user selection of an icon associated with a product. The computer system may be configured for communication with one or both of a point of sale terminal at a physical location of the merchant and a personal electronic device of a consumer.

Additional aspects of the present disclosure may be found in a system for dynamically selecting products for presentation to consumers in a hands-on environment of a merchant, based upon social signals acquired from consumers in an online environment. Such a system may comprise a computer system having one or more processors communicatively coupled to memory configured to store information identifying one or more products in association with social signals representative of expressions of consumer sentiment corresponding to the one or more products. The one or more processor may be operable to, at least, perform the actions of the method described above.

Further aspects of the present disclosure may be found, for example, in a non-transitory, computer-readable medium comprising executable instructions for causing one or more processors of a computer system to perform the steps of a method of dynamically selecting products for presentation to consumers in a hands-on environment of a merchant, based upon social signals acquired from consumers in an online environment. In such an embodiment, the one or processors may be communicatively coupled to memory configured to store information identifying one or more products in association with social signals representative of expressions of consumer sentiment corresponding to the one or more products, and the steps of the method may be as described above Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, embodiments in accordance with the present disclosure may be realized in hardware, software, or a combination of hardware and software. Embodiments in accordance with the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Embodiments of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
in a computer system comprising a product selection circuitry, graphical user interface (GUI) generation circuitry, wireless transceiver circuitry, an in-store display, and network interface circuitry:
generating, by the GUI generation circuitry, a GUI that presents information about products and that comprises a plurality of interface elements associated with user sentiment towards the products;
in response to interaction with one or more of the plurality of interface elements by a user:
determining, using the wireless transceiver circuitry, a geographic area in which the user is located by detecting, via the wireless transceiver circuitry, that a terminal device associated with the user is within a certain proximity of the in-store display system; and
communicating, via the network interface circuitry, with a sentiment database to update a numeric sentiment value for the particular product and the particular geographic area;
selecting, by the product selection circuitry based on the numeric sentiment values stored in the sentiment database for the plurality of products and the particular geographic area, which of the plurality of products to advertise on an in-store display system in the particular geographic area;
communicating, by the product selection circuitry via the network interface circuitry, the result of the selecting to the in-store display system; and
dynamically configuring, by the computer system, operation of the in-store display based on the result of the selecting communicated to the in-store display system.

2. The method according to claim 1, wherein the plurality of user interface elements comprise one or more of:
an interface element for user expression of liking the associated product;
an interface element for user expression of wanting the associated product;

an interface element for user expression of owning the associated product; and an interface element for user purchase of the associated product.

3. The method according to claim 1, wherein the selecting is performed at intervals of time determined based on a number of unique products associated with the one or more of the plurality of interface elements.

4. The method according to claim 1, wherein:

the computer system comprises a self-service terminal;

the result of the selecting communicated to the in-store display system comprises configuration information for configuring the self-service terminal to enable purchase of the product at the self-service terminal; and the method comprises configuring, based on the configuration information, the self-service terminal to enable purchase of the product based on the information.

5. The method according to claim 1, wherein the plurality of user interface elements comprise:

an interface element for submitting a product review;

an interface element for a product related message communicated from one consumer to another consumer; and an interface element that is an icon associated with a product.

6. The method according to claim 1, wherein the computer system is configured for communication, via one or both of the network interface circuitry and the wireless transceiver circuitry, with one or both of a point of sale terminal at a physical location of the merchant and a personal electronic device of a consumer.

7. A system comprising:

a computer system comprising product selection circuitry, graphical user interface (GUI) generation circuitry, wireless transceiver circuitry, an in-store display, and network interface circuitry, wherein:

the GUI generation circuitry is configured to generate a GUI that presents information about products and that comprises a plurality of interface elements associated with user sentiment;

the wireless transceiver circuitry is configured to, in response to interaction with one of the plurality of interface elements by a user:

determine a geographic area in which the user is located by detecting, via the wireless transceiver circuitry, that a terminal device associated with the user is within a certain proximity of the in-store display system; and communicate, via the network interface circuitry with a sentiment database to update a numeric sentiment value for the particular product and the particular geographic area identified from the stream of information representing product related interactions, based on the sentiment information expressed by users in the product related interactions involving the unique product; and the product selection circuitry is operable to:

select, based on the numeric sentiment values stored in the sentiment database for the plurality of products and the particular geographic area, which of the plurality of products to advertise on an in-store display system in the particular geographic area; and communicate, via the network interface circuitry, the result of the selection to the in-store display system;

wherein the in-store display is dynamically configured based on the result of the selection communicated to the in-store display.

8. The system according to claim 7, wherein the plurality of user interface elements comprise one or more of:

an interface element for user expression of liking the associated product;

an interface element for user expression of wanting the associated product;

an interface element for user expression of owning the associated product; and an interface element for user purchase of the associated product.

9. The system according to claim 7, wherein the selection is performed at intervals of time determined based on a number of unique products associated with the one or more of the plurality of interface elements.

10. The system according to claim 7, comprising a self-service terminal, wherein:

the result of the selection communicated to the in-store display system comprises configuration information for configuring a self-service terminal to enable purchase of the product at the self-service terminal; and the self-service terminal is configured, based on the configuration information, to enable purchase of the product based on the information.

11. The system according to claim 7, wherein the plurality of user interface elements comprise:

an interface element for submitting a product review;

an interface element for a product related message communicated from one consumer to another consumer; and an interface element that is an icon associated with a product.

12. The system according to claim 7, wherein the computer system is configured for communication, via one or both of the network interface circuitry and the wireless transceiver circuitry, with one or both of a point of sale terminal at a physical location of the merchant, and a personal electronic device of a consumer.

13. A non-transitory computer-readable medium comprising executable instructions for causing a computer system to perform a method comprising:

generating, by graphical user interface (GUI) generation circuitry of the computer system, a GUI that presents information about products and that comprises a plurality of interface elements associated with user sentiment:

in response to interaction with one or more of the plurality of interface elements by a user:

determining, using wireless transceiver circuitry of the computer system, a geographic area in which the user is located by detecting, via the wireless transceiver circuitry, that a terminal device associated with the user is within a certain proximity of an in-store display system; and communicating, via network interface circuitry of the computer system, with a sentiment database to update a numeric sentiment value for the particular product and the particular geographic area;

selecting, by product selection circuitry of the computer system based on the numeric sentiment values stored in the sentiment database for the plurality of products and the particular geographic area, which of the plurality of products to advertise on an in-store display system of the computer system in the particular geographic area;

communicating, by the product selection circuitry via the network interface circuitry, the result of the selecting to the in-store display system; and dynamically configuring, by the computer system, operation of the in-store display based on the result of the selecting communicated to the in-store display system.

14. The non-transitory computer-readable medium according to claim 13, wherein the plurality of user interface elements comprise one or more of:

an interface element for user expression of liking the associated product;

an interface element for user expression of wanting the associated product;

an interface element for user expression of owning the associated product; and an interface element for user purchase of the associated product.

15. The non-transitory computer-readable medium according to claim 13, wherein the selecting is performed at intervals of time determined based on a number of unique products associated with the one or more of the plurality of interface elements.

16. The non-transitory computer-readable medium according to claim 13, wherein:

the computer system comprises a self-service terminal;

the result of the selecting communicated to the in-store display system comprises configuration information for configuring the self-service terminal to enable purchase of the product at the self-service terminal; and the method comprises configuring, based on the configuration information, the self-service terminal to enable purchase of the product based on the information.

17. The non-transitory computer-readable medium according to claim 13, wherein the plurality of user interface elements comprise:

an interface element for submitting a product review;

an interface element for a product related message communicated from one consumer to another consumer; and an interface element that is an icon associated with a product.

18. The non-transitory computer-readable medium according to claim 13, wherein the computer system is configured for communication, via one or both of the network interface circuitry and the wireless transceiver circuitry, with one or both of a point of sale terminal at a physical location of the merchant and a personal electronic device of a consumer.

* * * * *